US011062144B2

(12) United States Patent
Newman et al.

(10) Patent No.: US 11,062,144 B2
(45) Date of Patent: Jul. 13, 2021

(54) CLASSIFYING VIDEO

(71) Applicant: Banjo, Inc., South Jordan, UT (US)

(72) Inventors: Joshua J. Newman, Salt Lake City, UT (US); Ravi Shankar Kannan, Sandy, UT (US); Krishnamohan Pathicherikollamparambil, Salt Lake City, UT (US)

(73) Assignee: Banjo, Inc., South Jordan, UT (US)

( * ) Notice: Subject to any disclaimer, the term of this patent is extended or adjusted under 35 U.S.C. 154(b) by 0 days.

(21) Appl. No.: 16/864,159

(22) Filed: May 1, 2020

(65) Prior Publication Data

US 2020/0364465 A1    Nov. 19, 2020

Related U.S. Application Data

(60) Provisional application No. 62/848,633, filed on May 16, 2019.

(51) Int. Cl.
*G06K 9/00* (2006.01)
*G06K 9/62* (2006.01)
*G06N 3/04* (2006.01)
*G06F 16/75* (2019.01)

(52) U.S. Cl.
CPC ......... *G06K 9/00758* (2013.01); *G06F 16/75* (2019.01); *G06K 9/00744* (2013.01); *G06K 9/6256* (2013.01); *G06K 9/6285* (2013.01); *G06N 3/0427* (2013.01); *G06N 3/0454* (2013.01)

(58) Field of Classification Search
CPC .......... G06K 9/00758; G06K 9/00744; G06K 9/6256; G06K 9/6285; G06F 16/75; G06N 3/0427; G06N 3/0454
See application file for complete search history.

(56) References Cited

U.S. PATENT DOCUMENTS

2019/0043003 A1*  2/2019  Fisher ...................... G01S 3/00

OTHER PUBLICATIONS

Kang et al, "NoScope: Optimizing Neural Network Queries over Video at Scale", 2017, Proceedings of the VLDB Endowment, vol. 10, No. 11, 12 pages (Year: 2017).*
Molchanov et al, "Pruning Convolutional Neural Networks for Resource Efficient Inference", 2017, arXiv preprint arXiv:1611.06440, 17 pages (Year: 2017).*

* cited by examiner

*Primary Examiner* — David F Dunphy
(74) *Attorney, Agent, or Firm* — Dodd Law Group; Michael B. Dodd

(57) ABSTRACT

The present invention extends to methods, systems, and computer program products for classifying video. In one aspect, a model is trained to classify video. A reference model capable of identifying signals from a plurality of signals classes is used along with tagged training data to train a signal class specific model. The signal class specific model uses less resources to identify the specific signal class model relative to the reference model. The signal class specific model can be deployed to an event detection infrastructure or other device. Frames from video streams can be classified using the signal class specific model.

24 Claims, 13 Drawing Sheets

CLASSIFYING VIDEO

CROSS-REFERENCE TO RELATED APPLICATIONS

This application claims the benefit of U.S. Provisional Patent Application Ser. No. 62/848,633, entitled "Classifying Video", filed May 16, 2019, which is incorporated herein in its entirety.

BACKGROUND

1. Background and Relevant Art

Entities (e.g., parents, guardians, friends, relatives, teachers, social workers, first responders, hospitals, delivery services, media outlets, government entities, etc.) may desire to be made aware of relevant events (e.g., fires, accidents, police presence, shootings, etc.) as close as possible to the events' occurrence. However, entities typically are not made aware of an event until after a person observes the event (or the event aftermath) and calls authorities.

In general, techniques that attempt to automate event detection are unreliable. Some techniques have attempted to mine social media data to detect the planning of events and forecast when events might occur. However, events can occur without prior planning and/or may not be detectable using social media data. Further, these techniques are not capable of meaningfully processing available data nor are these techniques capable of differentiating false data (e.g., hoax social media posts)

Other techniques use textual comparisons to compare textual content (e.g., keywords) in a data stream to event templates in a database. If text in a data stream matches keywords in an event template, the data stream is labeled as indicating an event.

Additional techniques use event specific sensors to detect specified types of event. For example, earthquake detectors can be used to detect earthquakes.

It may be that evidence of an event is contained in video. Video may be recorded video, for example, captured at a smart phone camera, that is uploaded in some way for viewing by others. Alternately, video can be live streaming video, for example, streaming from a smart phone camera, a traffic camera, another other public camera, or a private camera.

BRIEF SUMMARY

Examples extend to methods, systems, and computer program products for classifying video.

In one aspect, a model is trained to classify video. A plurality of video frames including one or more video frames from each of a plurality of cameras are accessed. Each camera included in the plurality of cameras captures a video stream within a field of view, wherein each field of view includes a scene of a requisite similarity relative to one another.

A reference model trained to detect signals of a plurality of different signal classes is accessed. A selection of a signal class from among the plurality of different signal classes is received. Tagged video frame training data corresponding to the selected signal class is formulated. Formulating the tagged video frame training data includes for each video frame in the plurality of video frames: (a) using the reference model is to detect whether content of the video frame indicates a signal of the selected signal class or does not indicate a signal the selected signal class and (b) tagging the video frame with an indication that the video frame does or does not indicate the signal of the selected signal class in accordance with the reference model detections.

A trained signal class specific model is derived from the tagged video frame training data and tailored to detect signals of the selected signal class. Deriving the trained signal class specific model includes arranging components of the trained signal class specific model to detect signals of the selected signal class using less computing resources relative to the computing resources used by the arrangement of components in the reference model to detect signals of the selected signal class.

In another aspect, a signal of a specific class is detected from video. A frame from a video stream captured within a field of view of a camera is accessed. The fame is compared to computed prior normal frames captured within the field of view within a first time period prior to accessing the frame. The frame is compared to computed historical normal frames captured within the field of view within a second time period prior to accessing the frame. The starting time of the second time period is less recent than the starting time of the first time period.

A relevant difference between the frame and the prior normal frames is detected. Another relevant difference between the frame and the historical normal frames is detected. The frame is supplied to a trained class specific model tailored to detect signals of a specific signal class from among a plurality of different signal classes. The arrangement of components in the trained signal class specific model is configured to detect signals of the specific signal class using less computing resources relative to computing resources used by the components in a reference model used to derive the trained signal class specific model, wherein the reference model is configured to detect any of the plurality of different signal classes. An indication if the trained class specific model detected a signal of the specific signal class in content of the frame is received.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Figure 1A:
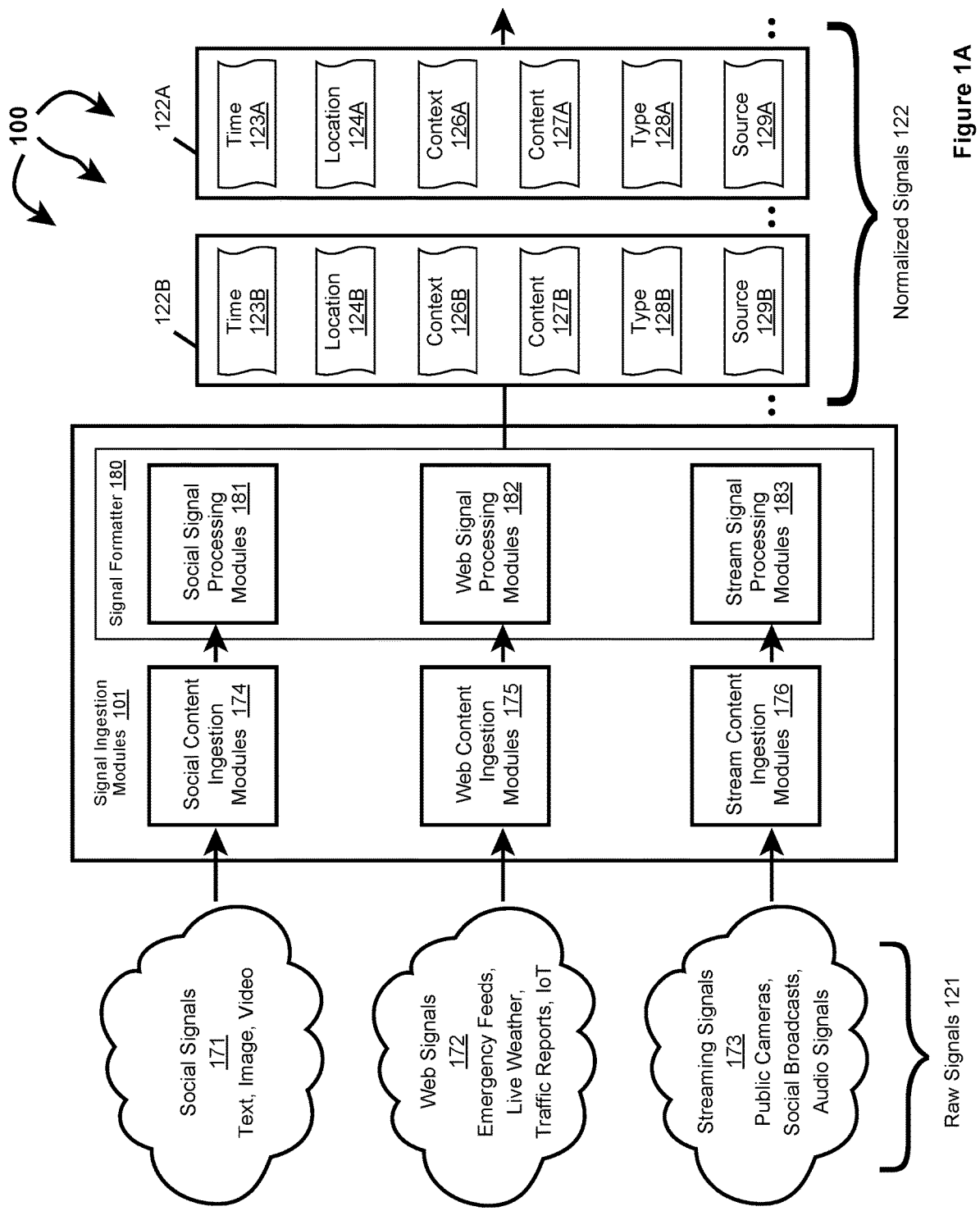
FIG. 1A illustrates an example computer architecture that facilitates ingesting signals.

Examples extend to methods, systems, and computer program products for classifying video.

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: video streams, video frames, signal classes, reference models, video frame training data, tags, untrained models, trained model configuration, trained signal class specific models, trained multi-signal class specific models, prior normal frames, historical normal frames, indications, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, video streams, video frames, signal classes, reference models, video frame training data, tags, untrained models, trained model configuration, trained signal class specific models, trained multi-signal class specific models, prior normal frames, historical normal frames, indications, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more Field Programmable Gate Arrays (FPGAs) and/or one or more application specific integrated circuits (ASICs) and/or one or more Tensor Processing Units (TPUs) can be programmed to carry out one or more of the systems and procedures described herein. Hardware, software, firmware, digital components, or analog components can be specifically tailor-designed for a higher speed detection or artificial intelligence that can enable signal processing. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

In this description and the following claims, a "geo cell" is defined as a piece of "cell" in a grid in any form. In one aspect, geo cells are arranged in a hierarchical structure. Cells of different geometries can be used.

A "geohash" is an example of a "geo cell".

In this description and the following claims, "geohash" is defined as a geocoding system which encodes a geographic location into a short string of letters and digits. Geohash is a hierarchical spatial data structure which subdivides space into buckets of grid shape (e.g., a square). Geohashes offer properties like arbitrary precision and the possibility of gradually removing characters from the end of the code to reduce its size (and gradually lose precision). As a consequence of the gradual precision degradation, nearby places will often (but not always) present similar prefixes. The longer a shared prefix is, the closer the two places are. geo cells can be used as a unique identifier and to represent point data (e.g., in databases).

In one aspect, a "geohash" is used to refer to a string encoding of an area or point on the Earth. The area or point on the Earth may be represented (among other possible coordinate systems) as a latitude/longitude or Easting/Northing—the choice of which is dependent on the coordinate system chosen to represent an area or point on the Earth. geo cell can refer to an encoding of this area or point, where the geo cell may be a binary string comprised of 0s and 1s corresponding to the area or point, or a string comprised of 0s, 1s, and a ternary character (such as X)—which is used to refer to a don't care character (0 or 1). A geo cell can also be represented as a string encoding of the area or point, for example, one possible encoding is base-32, where every 5 binary characters are encoded as an ASCII character. Depending on latitude, the size of an area defined at a specified geo cell precision can vary. In one example, as shown in Table 1. the areas defined at various geo cell precisions are approximately:

TABLE 1

Example Areas at Various Geo Cell Precisions

| geo cell Length/Precision | width × height |
|---|---|
| 1 | 5,009.4 km × 4,992.6 km |
| 2 | 1,252.3 km × 624.1 km |
| 3 | 156.5 km × 156 km |
| 4 | 39.1 km × 19.5 km |
| 5 | 4.9 km × 4.9 km |
| 6 | 1.2 km × 609.4 m |
| 7 | 152.9 m × 152.4 m |
| 8 | 38.2 m × 19 m |
| 9 | 4.8 m × 4.8 m |
| 10 | 1.2 m × 59.5 cm |
| 11 | 14.9 cm × 14.9 cm |
| 12 | 3.7 cm × 1.9 cm |

Other geo cell geometries can include hexagonal tiling, triangular tiling, and/or any other suitable geometric shape tiling. For example, the H3 geospatial indexing system can be a multi-precision hexagonal tiling of a sphere (e.g., the Earth) indexed with hierarchical linear indexes.

In another aspect, geo cells are a hierarchical decomposition of a sphere (such as the Earth) into representations of regions or points based a Hilbert curve (e.g., the S2 hierarchy or other hierarchies). Regions/points of the sphere can be projected into a cube and each face of the cube includes a quad-tree where the sphere point is projected into. After that, transformations can be applied and the space discretized. The geo cells are then enumerated on a Hilbert Curve (a space-filling curve that converts multiple dimensions into one dimension and preserves the approximate locality).

Due to the hierarchical nature of geo cells, any signal, event, entity, etc., associated with a geo cell of a specified precision is by default associated with any less precise geo cells that contain the geo cell. For example, if a signal is associated with a geo cell of precision 9, the signal is by default also associated with corresponding geo cells of precisions 1, 2, 3, 4, 5, 6, 7, and 8. Similar mechanisms are applicable to other tiling and geo cell arrangements. For example, S2 has a cell level hierarchy ranging from level zero (85,011,012 km$^2$) to level 30 (between 0.48 cm$^2$ to 0.96 cm$^2$).

Signal Ingestion and Normalization

Signal ingestion modules can ingest a variety of raw structured and/or raw unstructured signals on an on going basis and in essentially real-time. Raw signals can include social posts, live broadcasts, traffic camera feeds, other camera feeds (e.g., from other public cameras or from CCTV cameras), listening device feeds, 911 calls, weather data, planned events, IoT device data, crowd sourced traffic and road information, satellite data, air quality sensor data, smart city sensor data, public radio communication (e.g., among first responders and/or dispatchers, between air traffic controllers and pilots), subscription data services, etc.

Raw signals can include different data media types and different data formats, including social signals, Web signals, and streaming signals. Data media types can include audio, video, image, and text. Different formats can include text in XML, text in JavaScript Object Notation (JSON), text in RSS feed, plain text, video stream in Dynamic Adaptive Streaming over HTTP (DASH), video stream in HTTP Live Streaming (HLS), video stream in Real-Time Messaging Protocol (RTMP), other Multipurpose Internet Mail Extensions (MIME) types, etc. Handling different types and formats of data introduces inefficiencies into subsequent event detection processes, including when determining if different signals relate to the same event.

Accordingly, signal ingestion modules can normalize (e.g., prepare or pre-process) raw signals into normalized signals to increase efficiency and effectiveness of subsequent computing activities, such as, event detection, event notification, etc., that utilize the normalized signals. For example, signal ingestion modules can normalize raw signals into normalized signals having a Time, Location, and Context (TLC) dimensions. An event detection infrastructure can use the Time, Location, and Content dimensions to more efficiently and effectively detect events.

A Time (T) dimension can include a time of origin or alternatively a "event time" of a signal. A Location (L) dimension can include a location anywhere across a geographic area, such as, a country (e.g., the United States), a State, a defined area, an impacted area, an area defined by a geo cell, an address, etc.

A Context (C) dimension indicates circumstances surrounding formation/origination of a raw signal in terms that facilitate understanding and assessment of the raw signal. The Context (C) dimension of a raw signal can be derived from express as well as inferred signal features of the raw signal.

Per signal type and signal content, different normalization modules can be used to extract, derive, infer, etc. Time, Location, and Context dimensions from/for a raw signal. For example, one set of normalization modules can be configured to extract/derive/infer Time, Location and Context dimensions from/for social signals. Another set of normalization modules can be configured to extract/derive/infer Time, Location and Context dimensions from/for Web signals. A further set of normalization modules can be configured to extract/derive/infer Time, Location and Context dimensions from/for streaming signals.

Normalization modules for extracting/deriving/inferring Time, Location, and Context dimensions can include text processing modules, NLP modules, image processing modules, video processing modules, etc. The modules can be used to extract/derive/infer data representative of Time, Location, and Context dimensions for a signal. Time, Location, and Context dimensions for a signal can be extracted/derived/inferred from metadata and/or content of the signal.

For example, NLP modules can analyze metadata and content of a sound clip to identify a time, location, and keywords (e.g., fire, shooter, etc.). An acoustic listener can also interpret the meaning of sounds in a sound clip (e.g., a gunshot, vehicle collision, etc.) and convert to relevant context. Live acoustic listeners can determine the distance and direction of a sound. Similarly, image processing modules can analyze metadata and pixels in an image to identify a time, location and keywords (e.g., fire, shooter, etc.). Image processing modules can also interpret the meaning of parts of an image (e.g., a person holding a gun, flames, a store logo, etc.) and convert to relevant context. Other modules can perform similar operations for other types of content including text and video.

Per signal type, each set of normalization modules can differ but may include at least some similar modules or may share some common modules. For example, similar (or the same) image analysis modules can be used to extract named entities from social signal images and public camera feeds. Likewise, similar (or the same) NLP modules can be used to extract named entities from social signal text and web text.

In some aspects, an ingested signal includes sufficient expressly defined time, location, and context information upon ingestion. The expressly defined time, location, and context information is used to determine Time, Location, and Context dimensions for the ingested signal. In other aspects, an ingested signal lacks expressly defined location information or expressly defined location information is insufficient (e.g., lacks precision) upon ingestion. In these other aspects, Location dimension or additional Location dimension can be inferred from features of an ingested signal and/or through references to other data sources. In further aspects, an ingested signal lacks expressly defined context information or expressly defined context information is insufficient (e.g., lacks precision) upon ingestion. In these further aspects, Context dimension or additional Context dimension can be inferred from features of an ingested signal and/or through reference to other data sources.

In further aspects, time information may not be included, or included time information may not be given with high enough precision and Time dimension is inferred. For example, a user may post an image to a social network which had been taken some indeterminate time earlier.

Normalization modules can use named entity recognition and reference to a geo cell database to infer Location dimension. Named entities can be recognized in text, images, video, audio, or sensor data. The recognized named entities can be compared to named entities in geo cell entries. Matches indicate possible signal origination in a geographic area defined by a geo cell.

As such, a normalized signal can include a Time dimension, a Location dimension, a Context dimension (e.g., single source probabilities and probability details), a signal type, a signal source, and content.

A single source probability can be calculated by single source classifiers (e.g., machine learning models, artificial intelligence, neural networks, statistical models, etc.) that consider hundreds, thousands, or even more signal features (dimensions) of a signal. Single source classifiers can be based on binary models and/or multi-class models.

FIG. 1A depicts part of computer architecture 100 that facilitates ingesting and normalizing signals. As depicted, computer architecture 100 includes signal ingestion modules 101, social signals 171, Web signals 172, and streaming signals 173. Signal ingestion modules 101, social signals 171, Web signals 172, and streaming signals 173 can be connected to (or be part of) a network, such as, for example, a system bus, a Local Area Network ("LAN"), a Wide Area Network ("WAN"), and even the Internet. Accordingly, signal ingestion modules 101, social signals 171, Web signals 172, and streaming signals 173 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

Signal ingestion module(s) 101 can ingest raw signals 121, including social signals 171, web signals 172, and streaming signals 173, on an on going basis and in essentially real-time. Raw signals 121 can include social posts, recorded videos, streaming videos, traffic camera feeds, other camera feeds, listening device feeds, 911 calls, weather data, planned events, IoT device data, crowd sourced traffic and road information, satellite data, air quality sensor data, smart city sensor data, public radio communication, subscription data service data, etc. As such, potentially thousands, millions or even billions of unique raw signals, each with unique characteristics, are can be ingested and used determine event characteristics, such as, event truthfulness, event severity, event category or categories, etc.

Signal ingestion module(s) 101 include social content ingestion modules 174, web content ingestion modules 176, stream content ingestion modules 176, and signal formatter 180. Signal formatter 180 further includes social signal processing module 181, web signal processing module 182, and stream signal processing modules 183.

For each type of signal, a corresponding ingestion module and signal processing module can interoperate to normalize the signal into a Time, Location, Context (TLC) dimensions. For example, social content ingestion modules 174 and social signal processing module 181 can interoperate to normalize social signals 171 into TLC dimensions. Similarly, web content ingestion modules 176 and web signal processing module 182 can interoperate to normalize web signals 172 into TLC dimensions. Likewise, stream content ingestion modules 176 and stream signal processing modules 183 can interoperate to normalize streaming signals 173 into TLC dimensions.

In one aspect, signal content exceeding specified size requirements (e.g., audio or video) is cached upon ingestion. Signal ingestion modules 101 include a URL or other identifier to the cached content within the context for the signal.

In one aspect, signal formatter 180 includes modules for determining a single source probability as a ratio of signals turning into events based on the following signal properties: (1) event class (e.g., fire, accident, weather, etc.), (2) media type (e.g., text, image, audio, etc.), (3) source (e.g., twitter, traffic camera, first responder radio traffic, etc.), and (4) geo type (e.g., geo cell, region, or non-geo). Probabilities can be stored in a lookup table for different combinations of the signal properties. Features of a signal can be derived and used to query the lookup table. For example, the lookup table can be queried with terms ("accident", "image", "twitter", "region"). The corresponding ratio (probability) can be returned from the table.

In another aspect, signal formatter 180 includes a plurality of single source classifiers (e.g., artificial intelligence, machine learning modules, neural networks, etc.). Each single source classifier can consider hundreds, thousands, or even more signal features (dimensions) of a signal. Signal features of a signal can be derived and submitted to a signal source classifier. The single source classifier can return a probability that a signal indicates a type of event. Single source classifiers can be binary classifiers or multi-source classifiers.

Raw classifier output can be adjusted to more accurately represent a probability that a signal is a "true positive". For example, 1,000 signals whose raw classifier output is 0.9 may include 80% as true positives. Thus, probability can be adjusted to 0.8 to reflect true probability of the signal being a true positive. "Calibration" can be done in such a way that for any "calibrated score" this score reflects the true probability of a true positive outcome.

Signal ingestion modules 101 can insert one or more single source probabilities and corresponding probability details into a normalized signal to represent a Context (C) dimension. Probability details can indicate a probabilistic model and features used to calculate the probability. In one aspect, a probabilistic model and signal features are contained in a hash field.

Signal ingestion modules 101 can access "transdimensionality" transformations structured and defined in a "TLC" dimensional model. Signal ingestion modules 101 can apply the "transdimensionality" transformations to generic source data in raw signals to re-encode the source data into normalized data having lower dimensionality. Dimensionality reduction can include reducing dimensionality (e.g., hundreds, thousands, or even more signal features (dimensions)) of a raw signal into a normalized signal including a T vector, an L vector, and a C vector. At lower dimensionality, the complexity of measuring "distances" between dimensional vectors across different normalized signals is reduced.

Thus, in general, any received raw signals can be normalized into normalized signals including a Time (T) dimension, a Location (L) dimension, a Context (C) dimension, signal source, signal type, and content. Signal ingestion modules 101 can send normalized signals 122 to event detection infrastructure 103.

For example, signal ingestion modules 101 can send normalized signal 122A, including time 123A, location 124A, context 126A, content 127A, type 128A, and source 129A to event detection infrastructure 103. Similarly, signal ingestion modules 101 can send normalized signal 122B, including time 123B, location 124B, context 126B, content 127B, type 128B, and source 129B to event detection infrastructure 103.

Figure 2:
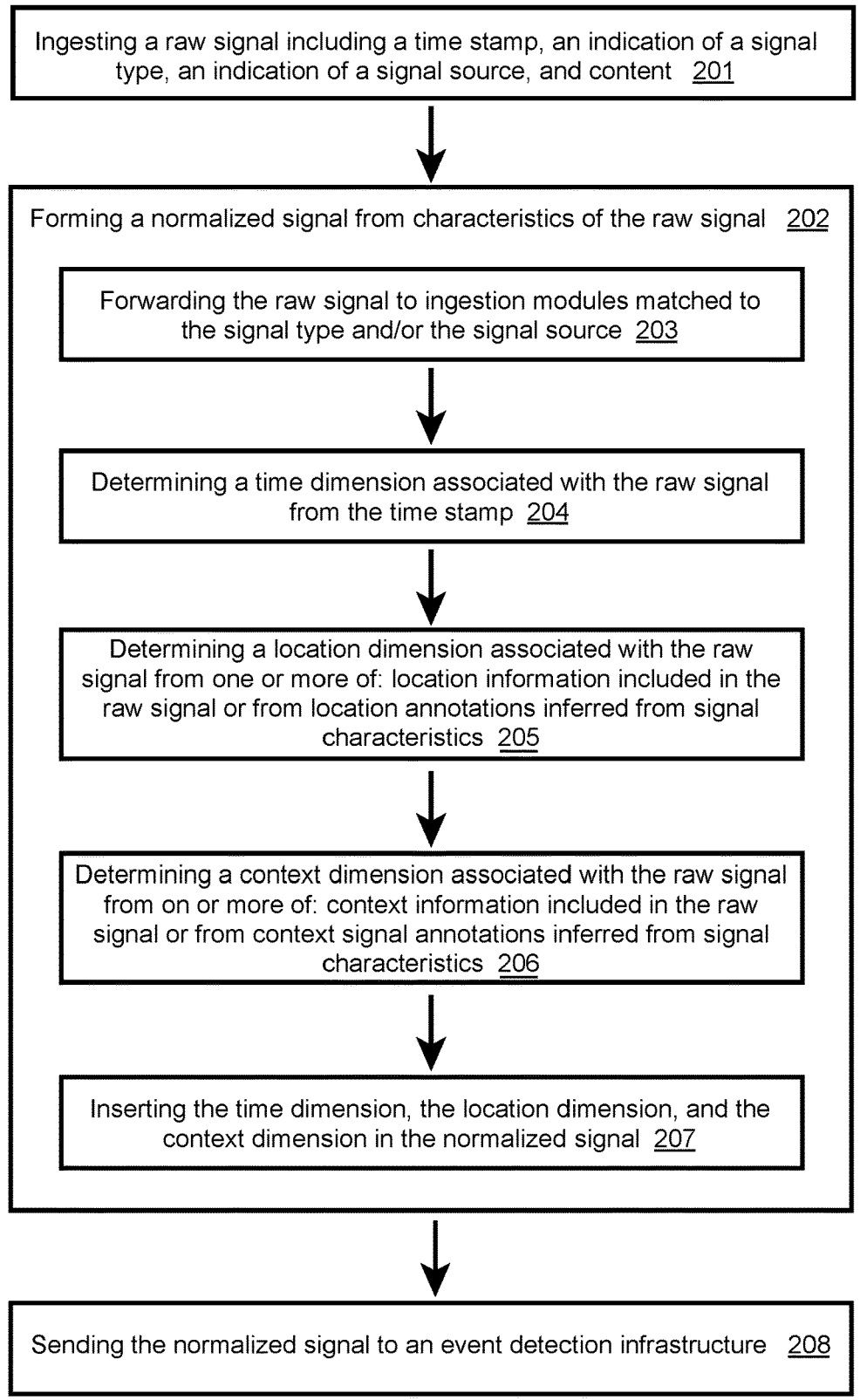
FIG. 2 illustrates a flow chart of an example method for normalizing ingested signals.

FIG. 2 illustrates a flow chart of an example method 200 for normalizing ingested signals. Method 200 will be described with respect to the components and data in computer architecture 100.

Method 200 includes ingesting a raw signal including a time stamp, an indication of a signal type, an indication of a signal source, and content (201). For example, signal ingestion modules 101 can ingest a raw signal 121 from one of: social signals 171, web signals 172, or streaming signals 173.

Method 200 includes forming a normalized signal from characteristics of the raw signal (202). For example, signal ingestion modules 101 can form a normalized signal 122A from the ingested raw signal 121.

Forming a normalized signal includes forwarding the raw signal to ingestion modules matched to the signal type and/or the signal source (203). For example, if ingested raw signal 121 is from social signals 171, raw signal 121 can be forwarded to social content ingestion modules 174 and social signal processing modules 181. If ingested raw signal 121 is from web signals 172, raw signal 121 can be forwarded to web content ingestion modules 175 and web signal processing modules 182. If ingested raw signal 121 is from streaming signals 173, raw signal 121 can be forwarded to streaming content ingestion modules 176 and streaming signal processing modules 183.

Forming a normalized signal includes determining a time dimension associated with the raw signal from the time stamp (204). For example, signal ingestion modules 101 can determine time 123A from a time stamp in ingested raw signal 121.

Forming a normalized signal includes determining a location dimension associated with the raw signal from one or more of: location information included in the raw signal or from location annotations inferred from signal characteristics (205). For example, signal ingestion modules 101 can determine location 124A from location information included in raw signal 121 or from location annotations derived from characteristics of raw signal 121 (e.g., signal source, signal type, signal content).

Forming a normalized signal includes determining a context dimension associated with the raw signal from one or more of: context information included in the raw signal or from context signal annotations inferred from signal characteristics (206). For example, signal ingestion modules 101 can determine context 126A from context information included in raw signal 121 or from context annotations derived from characteristics of raw signal 121 (e.g., signal source, signal type, signal content).

Forming a normalized signal includes inserting the time dimension, the location dimension, and the context dimension in the normalized signal (207). For example, signal ingestion modules 101 can insert time 123A, location 124A, and context 126A in normalized signal 122. Method 200 includes sending the normalized signal to an event detection infrastructure (208). For example, signal ingestion modules 101 can send normalized signal 122A to event detection infrastructure 103.

Figure 3A:
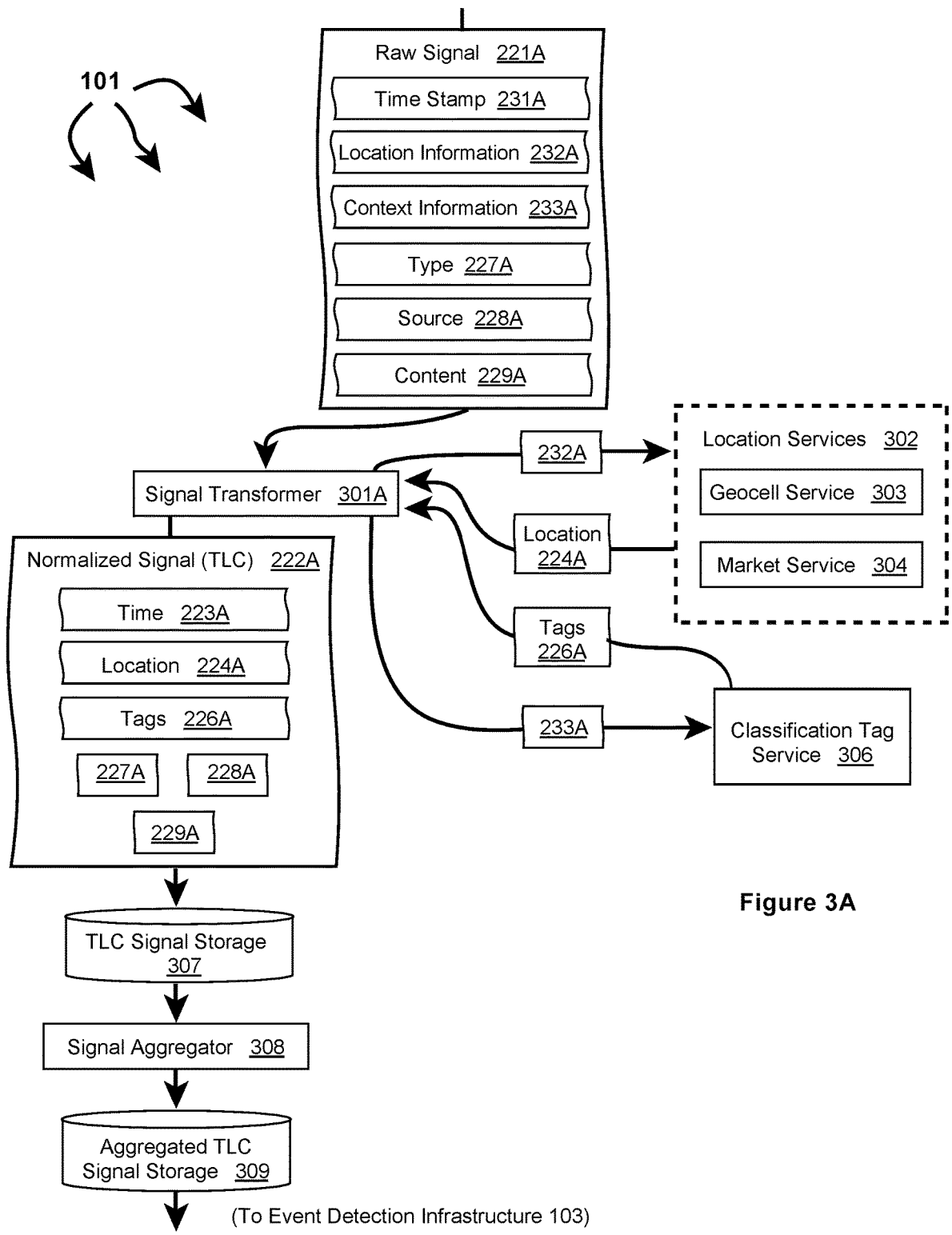
FIGS. 3A, 3B, and 3C illustrate other example components that can be included in signal ingestion modules.
Figure 3B:
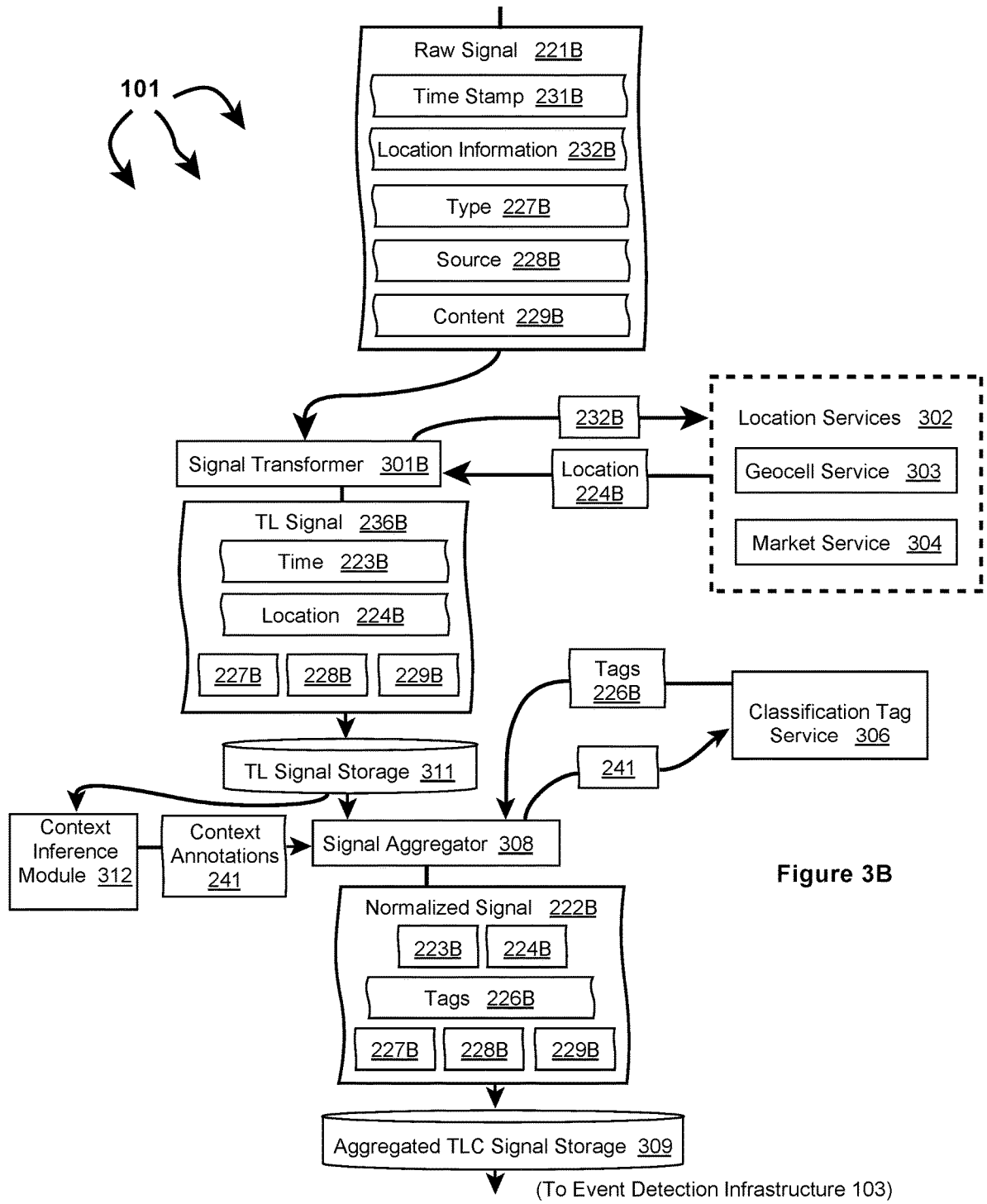
Figure 3C:
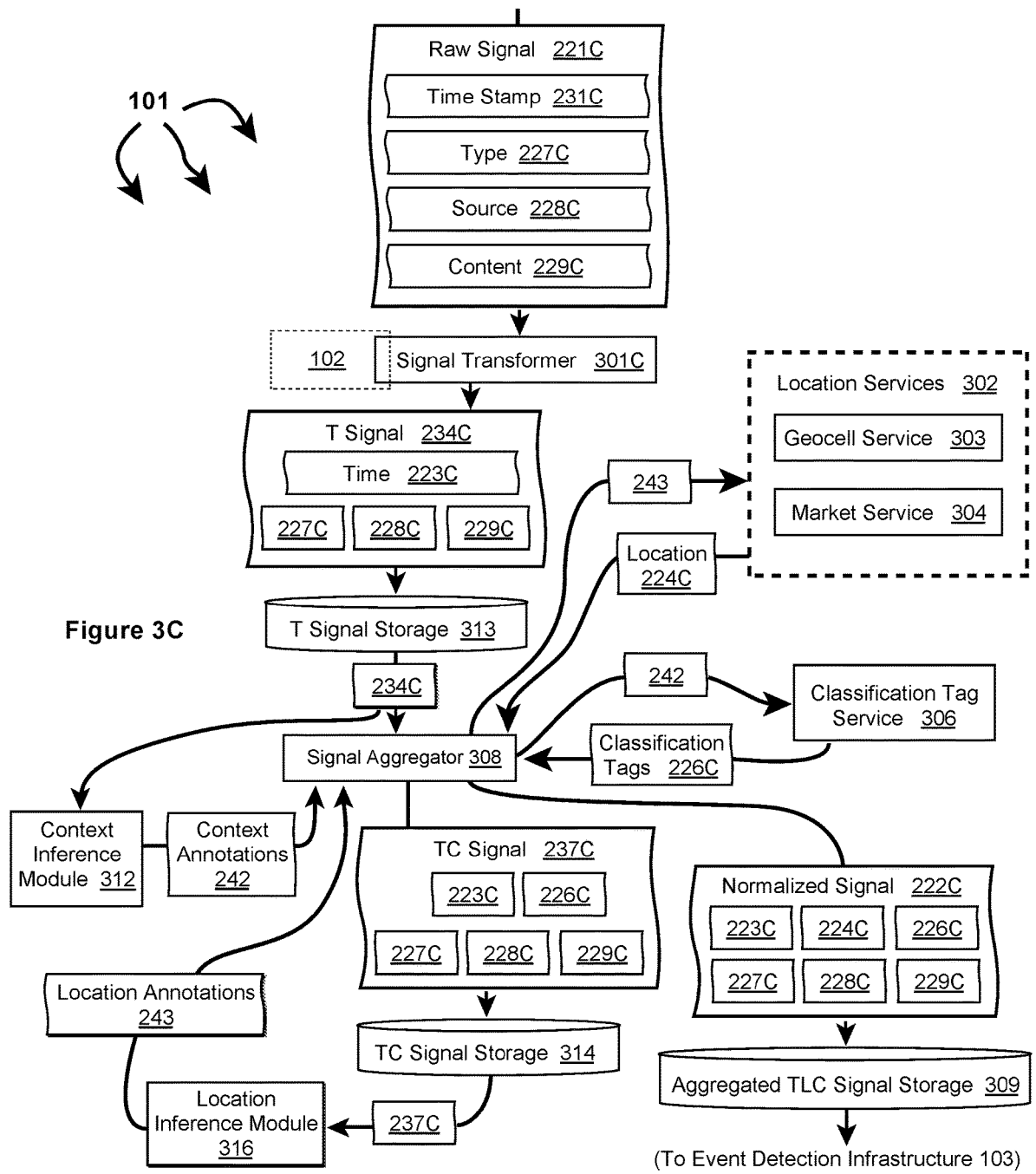

FIGS. 3A, 3B, and 3C depict other example components that can be included in signal ingestion modules 101. Signal ingestion modules 101 can include signal transformers for different types of signals including signal transformer 301A (for TLC signals), signal transformer 301B (for TL signals), and signal transformer 301C (for T signals). In one aspect, a single module combines the functionality of multiple different signal transformers.

Signal ingestion modules 101 can also include location services 302, classification tag service 306, signal aggregator 308, context inference module 312, and location inference module 316. Location services 302, classification tag service 306, signal aggregator 308, context inference module 312, and location inference module 316 or parts thereof can interoperate with and/or be integrated into any of ingestion modules 174, web content ingestion modules 176, stream content ingestion modules 176, social signal processing module 181, web signal processing module 182, and stream signal processing modules 183. Location services 302, classification tag service 306, signal aggregator 308, context inference module 312, and location inference module 316 can interoperate to implement "transdimensionality" transformations to reduce raw signal dimensionality into normalized TLC signals.

Signal ingestion modules 101 can also include storage for signals in different stages of normalization, including TLC signal storage 307, TL signal storage 311, T signal storage 313, TC signal storage 314, and aggregated TLC signal storage 309. In one aspect, data ingestion modules 101 implement a distributed messaging system. Each of signal storage 307, 309, 311, 313, and 314 can be implemented as a message container (e.g., a topic) associated with a type of message.

Figure 4:
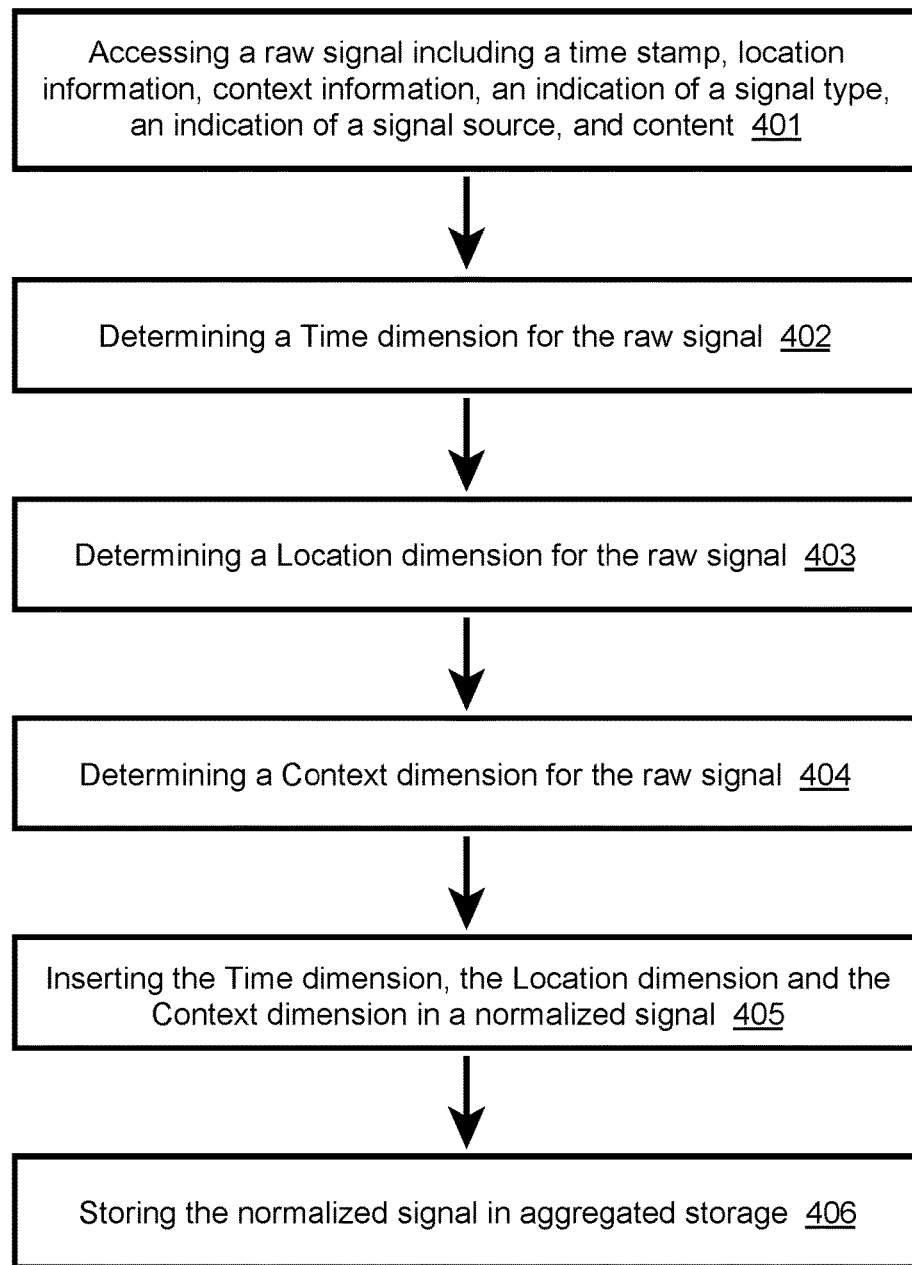
FIG. 4 illustrates a flow chart of an example method for normalizing an ingested signal including time information, location information, and context information.

FIG. 4 illustrates a flow chart of an example method 400 for normalizing an ingested signal including time information, location information, and context information. Method 400 will be described with respect to the components and data in FIG. 3A.

Method 400 includes accessing a raw signal including a time stamp, location information, context information, an indication of a signal type, an indication of a signal source, and content (401). For example, signal transformer 301A can access raw signal 221A. Raw signal 221A includes timestamp 231A, location information 232A (e.g., lat/lon, GPS coordinates, etc.), context information 233A (e.g., text expressly indicating a type of event), signal type 227A (e.g., social media, 911 communication, traffic camera feed, etc.), signal source 228A (e.g., Facebook, twitter, Waze, etc.), and signal content 229A (e.g., one or more of: image, video, text, keyword, locale, etc.).

Method 400 includes determining a Time dimension for the raw signal (402). For example, signal transformer 301A can determine time 223A from timestamp 231A.

Method 400 includes determining a Location dimension for the raw signal (403). For example, signal transformer 301A sends location information 232A to location services 302. Geo cell service 303 can identify a geo cell corresponding to location information 232A. Market service 304 can identify a designated market area (DMA) corresponding to location information 232A. Location services 302 can include the identified geo cell and/or DMA in location 224A. Location services 302 return location 224A to signal transformer 301.

Method 400 includes determining a Context dimension for the raw signal (404). For example, signal transformer 301A sends context information 233A to classification tag service 306. Classification tag service 306 identifies one or more classification tags 226A (e.g., fire, police presence, accident, natural disaster, etc.) from context information 233A. Classification tag service 306 returns classification tags 226A to signal transformer 301A.

Method 400 includes inserting the Time dimension, the Location dimension, and the Context dimension in a normalized signal (405). For example, signal transformer 301A can insert time 223A, location 224A, and tags 226A in normalized signal 222A (a TLC signal). Method 400 includes storing the normalized signal in signal storage (406). For example, signal transformer 301A can store normalized signal 222A in TLC signal storage 307. (Although not depicted, timestamp 231A, location information 232A, and context information 233A can also be included (or remain) in normalized signal 222A).

Method 400 includes storing the normalized signal in aggregated storage (406). For example, signal aggregator 308 can aggregate normalized signal 222A along with other normalized signals determined to relate to the same event. In one aspect, signal aggregator 308 forms a sequence of signals related to the same event. Signal aggregator 308 stores the signal sequence, including normalized signal 222A, in aggregated TLC storage 309 and eventually forwards the signal sequence to event detection infrastructure 103.

Figure 5:
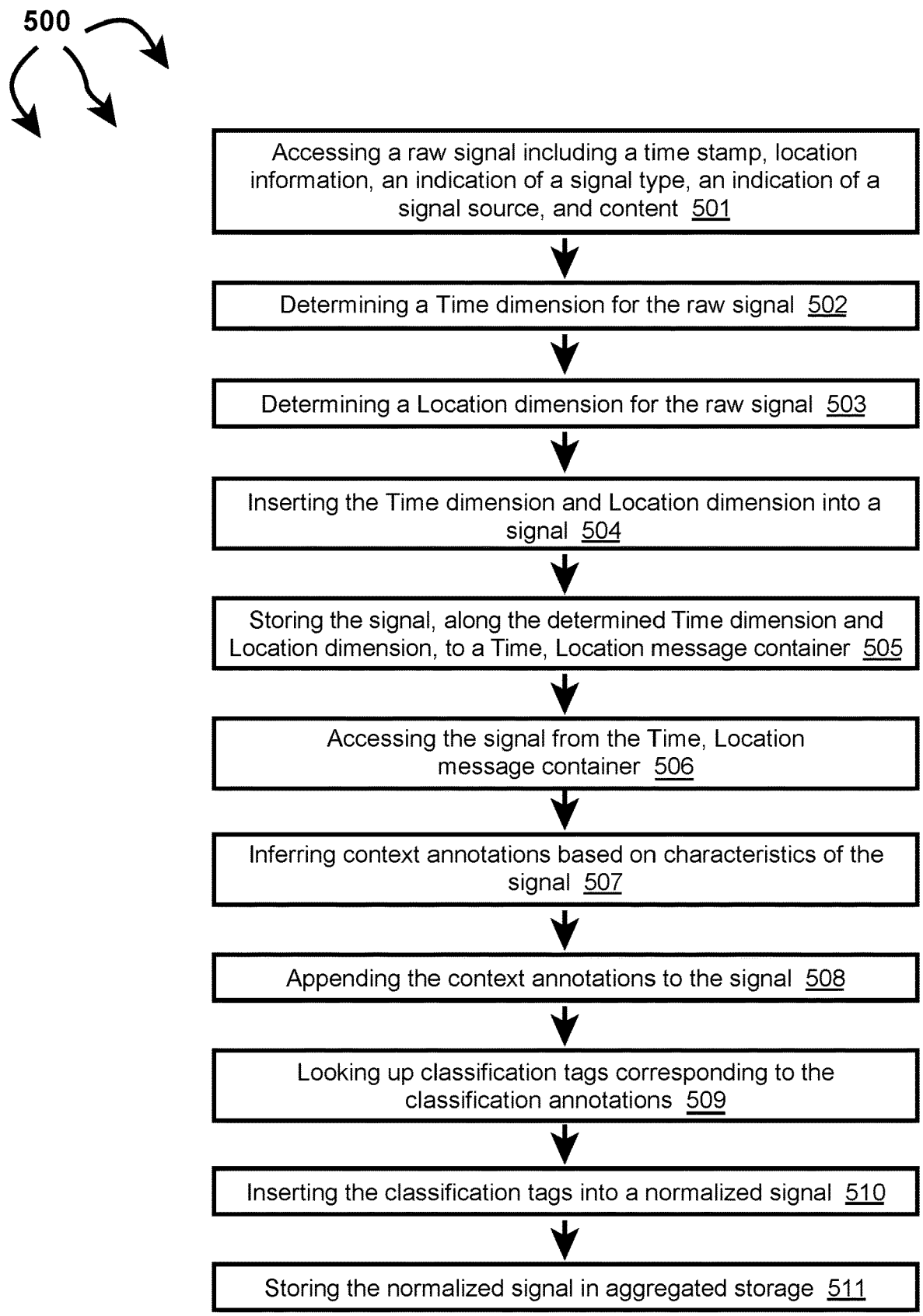
FIG. 5 illustrates a flow chart of an example method for normalizing an ingested signal including time information and location information.

FIG. 5 illustrates a flow chart of an example method 500 for normalizing an ingested signal including time information and location information. Method 500 will be described with respect to the components and data in FIG. 3B.

Method 500 includes accessing a raw signal including a time stamp, location information, an indication of a signal type, an indication of a signal source, and content (501). For example, signal transformer 301B can access raw signal 221B. Raw signal 221B includes timestamp 231B, location information 232B (e.g., lat/lon, GPS coordinates, etc.), signal type 227B (e.g., social media, 911 communication, traffic camera feed, etc.), signal source 228B (e.g., Facebook, twitter, Waze, etc.), and signal content 229B (e.g., one or more of: image, video, audio, text, keyword, locale, etc.).

Method 500 includes determining a Time dimension for the raw signal (502). For example, signal transformer 301B can determine time 223B from timestamp 231B.

Method 500 includes determining a Location dimension for the raw signal (503). For example, signal transformer 301B sends location information 232B to location services 302. Geo cell service 303 can be identify a geo cell corresponding to location information 232B. Market service 304 can identify a designated market area (DMA) corresponding to location information 232B. Location services 302 can include the identified geo cell and/or DMA in location 224B. Location services 302 returns location 224B to signal transformer 301.

Method 500 includes inserting the Time dimension and Location dimension into a signal (504). For example, signal transformer 301B can insert time 223B and location 224B into TL signal 236B. (Although not depicted, timestamp 231B and location information 232B can also be included (or remain) in TL signal 236B). Method 500 includes storing the signal, along with the determined Time dimension and Location dimension, to a Time, Location message container (505). For example, signal transformer 301B can store TL signal 236B to TL signal storage 311. Method 500 includes accessing the signal from the Time, Location message container (506). For example, signal aggregator 308 can access TL signal 236B from TL signal storage 311.

Method 500 includes inferring context annotations based on characteristics of the signal (507). For example, context inference module 312 can access TL signal 236B from TL signal storage 311. Context inference module 312 can infer context annotations 241 from characteristics of TL signal 236B, including one or more of: time 223B, location 224B, type 227B, source 228B, and content 229B. In one aspect, context inference module 312 includes one or more of: NLP modules, audio analysis modules, image analysis modules, video analysis modules, etc. Context inference module 312 can process content 229B in view of time 223B, location 224B, type 227B, source 228B, to infer context annotations 241 (e.g., using machine learning, artificial intelligence, neural networks, machine classifiers, etc.). For example, if content 229B is an image that depicts flames and a fire engine, context inference module 312 can infer that content 229B is related to a fire. Context inference 312 module can return context annotations 241 to signal aggregator 308.

Method 500 includes appending the context annotations to the signal (508). For example, signal aggregator 308 can append context annotations 241 to TL signal 236B. Method 500 includes looking up classification tags corresponding to the classification annotations (509). For example, signal aggregator 308 can send context annotations 241 to classification tag service 306. Classification tag service 306 can identify one or more classification tags 226B (a Context dimension) (e.g., fire, police presence, accident, natural disaster, etc.) from context annotations 241. Classification tag service 306 returns classification tags 226B to signal aggregator 308.

Method 500 includes inserting the classification tags in a normalized signal (510). For example, signal aggregator 308 can insert tags 226B (a Context dimension) into normalized signal 222B (a TLC signal). Method 500 includes storing the normalized signal in aggregated storage (511). For example, signal aggregator 308 can aggregate normalized signal 222B along with other normalized signals determined to relate to the same event. In one aspect, signal aggregator 308 forms a sequence of signals related to the same event. Signal aggregator 308 stores the signal sequence, including normalized signal 222B, in aggregated TLC storage 309 and eventually forwards the signal sequence to event detection infrastructure 103. (Although not depicted, timestamp 231B, location information 232C, and context annotations 241 can also be included (or remain) in normalized signal 222B).

Figure 6:
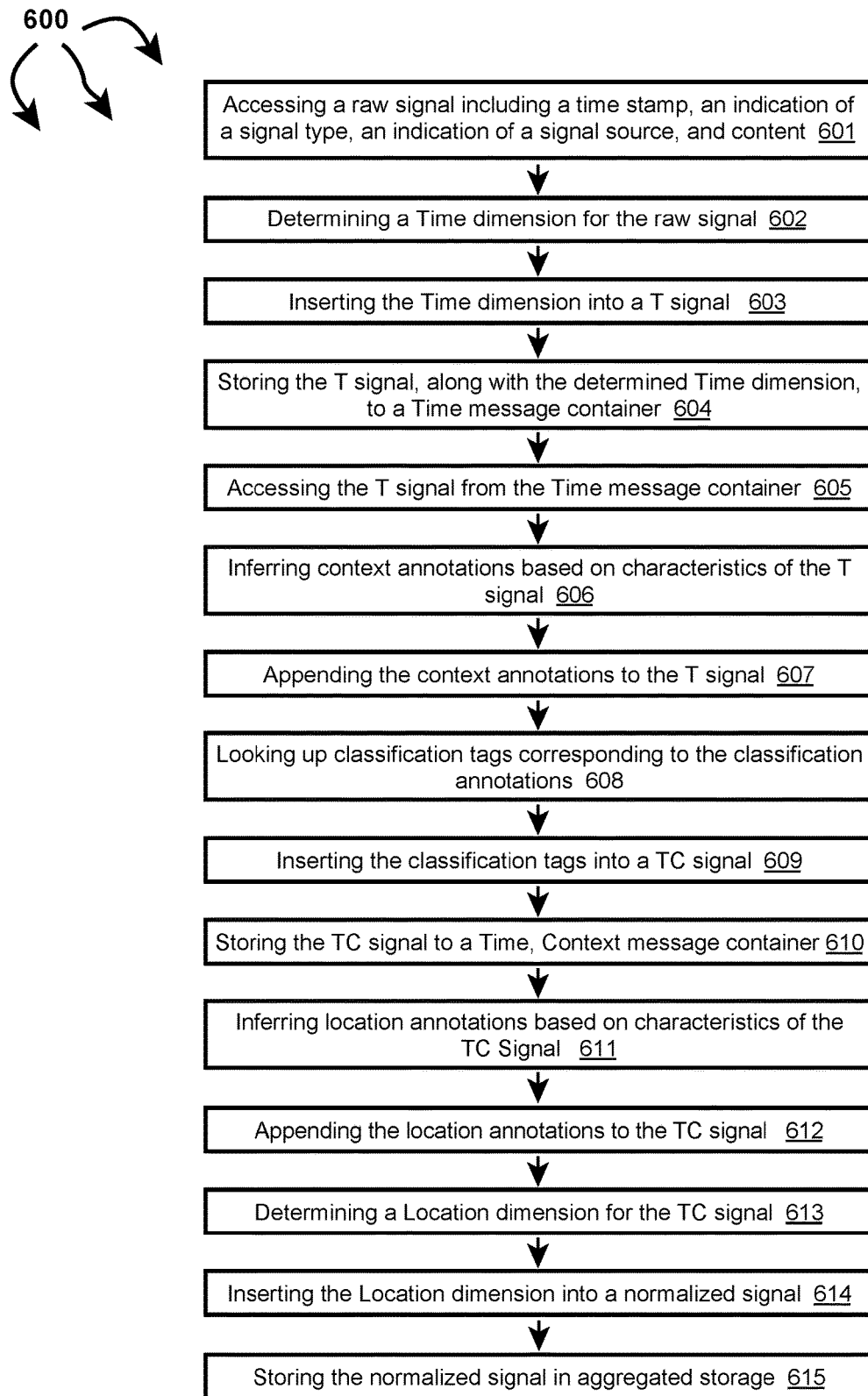
FIG. 6 illustrates a flow chart of an example method for normalizing an ingested signal including time information.

FIG. 6 illustrates a flow chart of an example method 600 for normalizing an ingested signal including time information and location information. Method 600 will be described with respect to the components and data in FIG. 3C.

Method 600 includes accessing a raw signal including a time stamp, an indication of a signal type, an indication of a signal source, and content (601). For example, signal transformer 301C can access raw signal 221C. Raw signal 221C includes timestamp 231C, signal type 227C (e.g., social media, 911 communication, traffic camera feed, etc.), signal source 228C (e.g., Facebook, twitter, Waze, etc.), and signal content 229C (e.g., one or more of: image, video, text, keyword, locale, etc.).

Method 600 includes determining a Time dimension for the raw signal (602). For example, signal transformer 301C can determine time 223C from timestamp 231C. Method 600 includes inserting the Time dimension into a T signal (603). For example, signal transformer 301C can insert time 223C into T signal 234C. (Although not depicted, timestamp 231C can also be included (or remain) in T signal 234C).

Method 600 includes storing the T signal, along with the determined Time dimension, to a Time message container (604). For example, signal transformer 301C can store T signal 236C to T signal storage 313. Method 600 includes accessing the T signal from the Time message container (605). For example, signal aggregator 308 can access T signal 234C from T signal storage 313.

Method 600 includes inferring context annotations based on characteristics of the T signal (606). For example, context inference module 312 can access T signal 234C from T signal storage 313. Context inference module 312 can infer context annotations 242 from characteristics of T signal 234C, including one or more of: time 223C, type 227C, source 228C, and content 229C. As described, context inference module 312 can include one or more of: NLP modules, audio analysis modules, image analysis modules, video analysis modules, etc. Context inference module 312 can process content 229C in view of time 223C, type 227C, source 228C, to infer context annotations 242 (e.g., using machine learning, artificial intelligence, neural networks, machine classifiers, etc.). For example, if content 229C is a video depicting two vehicles colliding on a roadway, context inference module 312 can infer that content 229C is related to an accident. Context inference 312 module can return context annotations 242 to signal aggregator 308.

Method 600 includes appending the context annotations to the T signal (607). For example, signal aggregator 308 can append context annotations 242 to T signal 234C. Method 600 includes looking up classification tags corresponding to the classification annotations (608). For example, signal aggregator 308 can send context annotations 242 to classification tag service 306. Classification tag service 306 can identify one or more classification tags 226C (a Context dimension) (e.g., fire, police presence, accident, natural disaster, etc.) from context annotations 242. Classification tag service 306 returns classification tags 226C to signal aggregator 308.

Method 600 includes inserting the classification tags into a TC signal (609). For example, signal aggregator 308 can insert tags 226C into TC signal 237C. Method 600 includes storing the TC signal to a Time, Context message container (610). For example, signal aggregator 308 can store TC signal 237C in TC signal storage 314. (Although not depicted, timestamp 231C and context annotations 242 can also be included (or remain) in normalized signal 237C).

Method 600 includes inferring location annotations based on characteristics of the TC signal (611). For example, location inference module 316 can access TC signal 237C from TC signal storage 314. Location inference module 316 can include one or more of: NLP modules, audio analysis modules, image analysis modules, video analysis modules, etc. Location inference module 316 can process content 229C in view of time 223C, type 227C, source 228C, and classification tags 226C (and possibly context annotations 242) to infer location annotations 243 (e.g., using machine learning, artificial intelligence, neural networks, machine classifiers, etc.). For example, if content 229C is a video depicting two vehicles colliding on a roadway, the video can include a nearby street sign, business name, etc. Location inference module 316 can infer a location from the street sign, business name, etc. Location inference module 316 can return location annotations 243 to signal aggregator 308.

Method 600 includes appending the location annotations to the TC signal with location annotations (612). For example, signal aggregator 308 can append location annotations 243 to TC signal 237C. Method 600 determining a Location dimension for the TC signal (613). For example, signal aggregator 308 can send location annotations 243 to location services 302. Geo cell service 303 can identify a geo cell corresponding to location annotations 243. Market service 304 can identify a designated market area (DMA) corresponding to location annotations 243. Location services 302 can include the identified geo cell and/or DMA in location 224C. Location services 302 returns location 224C to signal aggregation services 308.

Method 600 includes inserting the Location dimension into a normalized signal (614). For example, signal aggregator 308 can insert location 224C into normalized signal 222C. Method 600 includes storing the normalized signal in aggregated storage (615). For example, signal aggregator 308 can aggregate normalized signal 222C along with other normalized signals determined to relate to the same event. In one aspect, signal aggregator 308 forms a sequence of signals related to the same event. Signal aggregator 308 stores the signal sequence, including normalized signal 222C, in aggregated TLC storage 309 and eventually forwards the signal sequence to event detection infrastructure 103. (Although not depicted, timestamp 231B, context annotations 241, and location annotations 24, can also be included (or remain) in normalized signal 222B).

In another aspect, a Location dimension is determined prior to a Context dimension when a T signal is accessed. A Location dimension (e.g., geo cell and/or DMA) and/or location annotations are used when inferring context annotations.

Accordingly, location services 302 can identify a geo cell and/or DMA for a signal from location information in the signal and/or from inferred location annotations. Similarly, classification tag service 306 can identify classification tags for a signal from context information in the signal and/or from inferred context annotations.

Signal aggregator 308 can concurrently handle a plurality of signals in a plurality of different stages of normalization. For example, signal aggregator 308 can concurrently ingest and/or process a plurality T signals, a plurality of TL signals, a plurality of TC signals, and a plurality of TLC signals. Accordingly, aspects of the invention facilitate acquisition of live, ongoing forms of data into an event detection system with signal aggregator 308 acting as an "air traffic controller" of live data. Signals from multiple sources of data can be aggregated and normalized for a common purpose (e.g., of event detection). Data ingestion, event detection, and event notification can process data through multiple stages of logic with concurrency.

As such, a unified interface can handle incoming signals and content of any kind. The interface can handle live extraction of signals across dimensions of time, location, and context. In some aspects, heuristic processes are used to determine one or more dimensions. Acquired signals can include text and images as well as live-feed binaries, including live media in audio, speech, fast still frames, video streams, etc.

Signal normalization enables the world's live signals to be collected at scale and analyzed for detection and validation of live events happening globally. A data ingestion and event detection pipeline aggregates signals and combines detections of various strengths into truthful events. Thus, normalization increases event detection efficiency facilitating event detection closer to "live time" or at "moment zero".

Event Detection

Figure 1B:
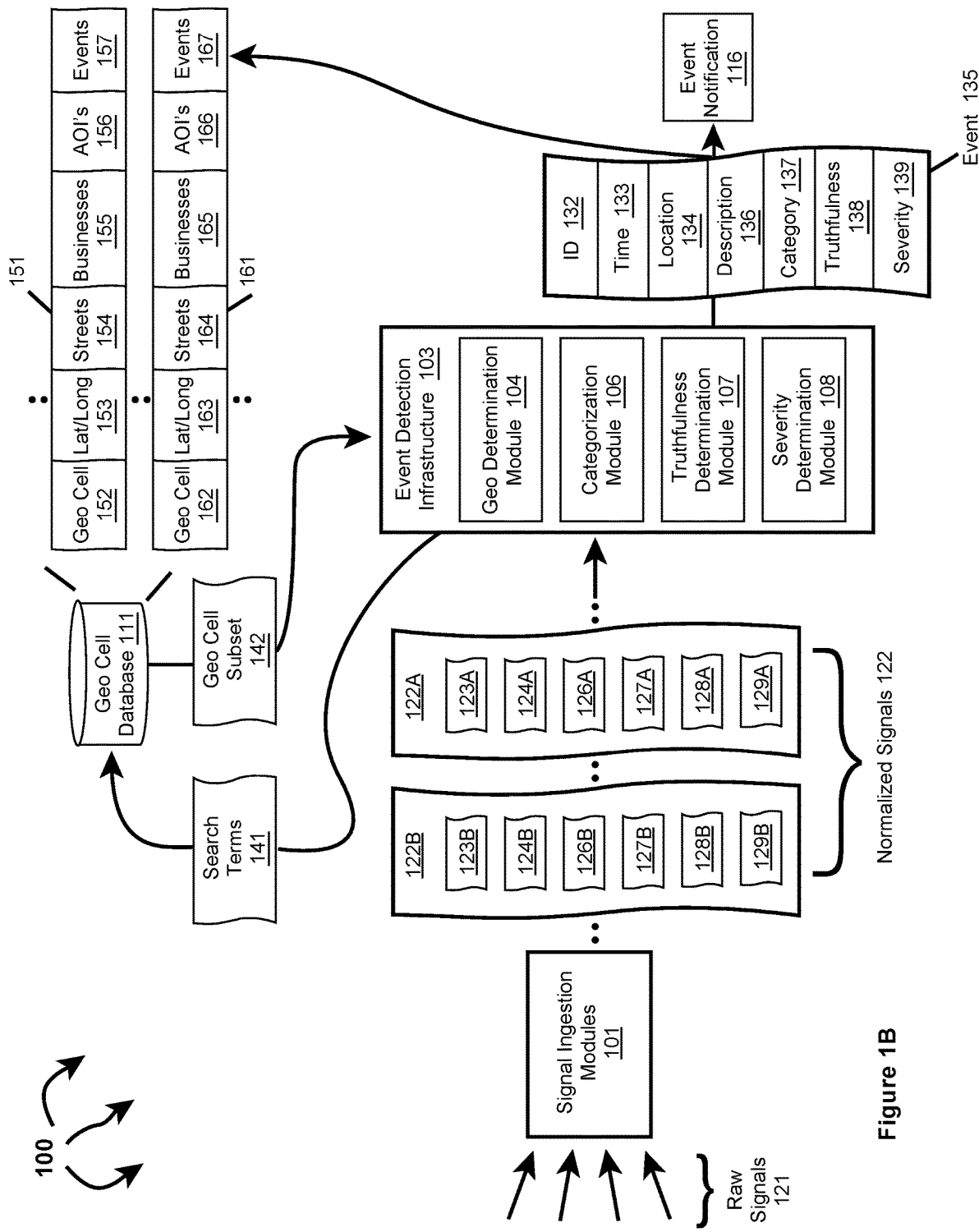
FIG. 1B illustrates an example computer architecture that facilitates detecting events.

Turning back to FIG. 1B, computer architecture 100 also includes components that facilitate detecting events. As depicted, computer architecture 100 includes geo cell database 111 and event notification 116. Geo cell database 111 and event notification 116 can be connected to (or be part of) a network with signal ingestion modules 101 and event detection infrastructure 103. As such, geo cell database 111 and even notification 116 can create and exchange message related data over the network.

As described, in general, on an ongoing basis, concurrently with signal ingestion (and also essentially in real-time), event detection infrastructure 103 detects different categories of (planned and unplanned) events (e.g., fire, police response, mass shooting, traffic accident, natural disaster, storm, active shooter, concerts, protests, etc.) in different locations (e.g., anywhere across a geographic area, such as, the United States, a State, a defined area, an impacted area, an area defined by a geo cell, an address, etc.), at different times from Time, Location, and Context dimensions included in normalized signals. Since, normalized signals are normalized to include Time, Location, and Context dimensions, event detection infrastructure 103 can handle normalized signals in a more uniform manner increasing event detection efficiency and effectiveness.

Event detection infrastructure 103 can also determine an event truthfulness, event severity, and an associated geo cell. In one aspect, a Context dimension in a normalized signal increases the efficiency and effectiveness of determining truthfulness, severity, and an associated geo cell.

Generally, an event truthfulness indicates how likely a detected event is actually an event (vs. a hoax, fake, misinterpreted, etc.). Truthfulness can range from less likely to be true to more likely to be true. In one aspect, truthfulness is represented as a numerical value, such as, for example, from 1 (less truthful) to 10 (more truthful) or as percentage value in a percentage range, such as, for example, from 0%

(less truthful) to 100% (more truthful). Other truthfulness representations are also possible. For example, truthfulness can be a dimension or represented by one or more vectors.

Generally, an event severity indicates how severe an event is (e.g., what degree of badness, what degree of damage, etc. is associated with the event). Severity can range from less severe (e.g., a single vehicle accident without injuries) to more severe (e.g., multi vehicle accident with multiple injuries and a possible fatality). As another example, a shooting event can also range from less severe (e.g., one victim without life threatening injuries) to more severe (e.g., multiple injuries and multiple fatalities). In one aspect, severity is represented as a numerical value, such as, for example, from 1 (less severe) to 5 (more severe). Other severity representations are also possible. For example, severity can be a dimension or represented by one or more vectors.

In general, event detection infrastructure 103 can include a geo determination module including modules for processing different kinds of content including location, time, context, text, images, audio, and video into search terms. The geo determination module can query a geo cell database with search terms formulated from normalized signal content. The geo cell database can return any geo cells having matching supplemental information. For example, if a search term includes a street name, a subset of one or more geo cells including the street name in supplemental information can be returned to the event detection infrastructure. Event detection infrastructure 103 can use the subset of geo cells to determine a geo cell associated with an event location. Events associated with a geo cell can be stored back into an entry for the geo cell in the geo cell database. Thus, over time an historical progression of events within a geo cell can be accumulated.

As such, event detection infrastructure 103 can assign an event ID, an event time, an event location, an event category, an event description, an event truthfulness, and an event severity to each detected event. Detected events can be sent to relevant entities, including to mobile devices, to computer systems, to APIs, to data storage, etc.

Event detection infrastructure 103 detects events from information contained in normalized signals 122. Event detection infrastructure 103 can detect an event from a single normalized signal 122 or from multiple normalized signals 122. In one aspect, event detection infrastructure 103 detects an event based on information contained in one or more normalized signals 122. In another aspect, event detection infrastructure 103 detects a possible event based on information contained in one or more normalized signals 122. Event detection infrastructure 103 then validates the potential event as an event based on information contained in one or more other normalized signals 122.

As depicted, event detection infrastructure 103 includes geo determination module 104, categorization module 106, truthfulness determination module 107, and severity determination module 108.

Generally, geo determination module 104 can include NLP modules, image analysis modules, etc. for identifying location information from a normalized signal. Geo determination module 104 can formulate (e.g., location) search terms 141 by using NLP modules to process audio, using image analysis modules to process images and video frames, etc. Search terms can include street addresses, building names, landmark names, location names, school names, image fingerprints, etc. Event detection infrastructure 103 can use a URL or identifier to access cached content when appropriate.

Generally, categorization module 106 can categorize a detected event into one of a plurality of different categories (e.g., fire, police response, mass shooting, traffic accident, natural disaster, storm, active shooter, concerts, protests, etc.) based on the content of normalized signals used to detect and/or otherwise related to an event.

Generally, truthfulness determination module 107 can determine the truthfulness of a detected event based on one or more of: source, type, age, and content of normalized signals used to detect and/or otherwise related to the event. Some signal types may be inherently more reliable than other signal types. For example, video from a live traffic camera feed may be more reliable than text in a social media post. Some signal sources may be inherently more reliable than others. For example, a social media account of a government agency may be more reliable than a social media account of an individual. The reliability of a signal can decay over time.

Generally, severity determination module 108 can determine the severity of a detected event based on or more of: location, content (e.g., dispatch codes, keywords, etc.), and volume of normalized signals used to detect and/or otherwise related to an event. Events at some locations may be inherently more severe than events at other locations. For example, an event at a hospital is potentially more severe than the same event at an abandoned warehouse. Event category can also be considered when determining severity. For example, an event categorized as a "Shooting" may be inherently more severe than an event categorized as "Police Presence" since a shooting implies that someone has been injured.

Geo cell database 111 includes a plurality of geo cell entries. Each geo cell entry is included in a geo cell defining an area and corresponding supplemental information about things included in the defined area. The corresponding supplemental information can include latitude/longitude, street names in the area defined by and/or beyond the geo cell, businesses in the area defined by the geo cell, other Areas of Interest (AOIs) (e.g., event venues, such as, arenas, stadiums, theaters, concert halls, etc.) in the area defined by the geo cell, image fingerprints derived from images captured in the area defined by the geo cell, and prior events that have occurred in the area defined by the geo cell. For example, geo cell entry 151 includes geo cell 152, lat/lon 153, streets 154, businesses 155, AOIs 156, and prior events 157. Each event in prior events 157 can include a location (e.g., a street address), a time (event occurrence time), an event category, an event truthfulness, an event severity, and an event description. Similarly, geo cell entry 161 includes geo cell 162, lat/lon 163, streets 164, businesses 165, AOIs 166, and prior events 167. Each event in prior events 167 can include a location (e.g., a street address), a time (event occurrence time), an event category, an event truthfulness, an event severity, and an event description.

Other geo cell entries can include the same or different (more or less) supplemental information, for example, depending on infrastructure density in an area. For example, a geo cell entry for an urban area can contain more diverse supplemental information than a geo cell entry for an agricultural area (e.g., in an empty field).

Geo cell database 111 can store geo cell entries in a hierarchical arrangement based on geo cell precision. As such, geo cell information of more precise geo cells is included in the geo cell information for any less precise geo cells that include the more precise geo cell.

Geo determination module 104 can query geo cell database 111 with search terms 141. Geo cell database 111 can identify any geo cells having supplemental information that matches search terms 141. For example, if search terms 141 include a street address and a business name, geo cell database 111 can identify geo cells having the street name and business name in the area defined by the geo cell. Geo cell database 111 can return any identified geo cells to geo determination module 104 in geo cell subset 142.

Geo determination module can use geo cell subset 142 to determine the location of event 135 and/or a geo cell associated with event 135. As depicted, event 135 includes event ID 132, time 133, location 137, description 136, category 137, truthfulness 138, and severity 139.

Event detection infrastructure 103 can also determine that event 135 occurred in an area defined by geo cell 162 (e.g., a geohash having precision of level 7 or level 9). For example, event detection infrastructure 103 can determine that location 134 is in the area defined by geo cell 162. As such, event detection infrastructure 103 can store event 135 in events 167 (i.e., historical events that have occurred in the area defined by geo cell 162).

Event detection infrastructure 103 can also send event 135 to event notification module 116. Event notification module 116 can notify one or more entities about event 135.

Signal Class Model Derivation

Figure 7:
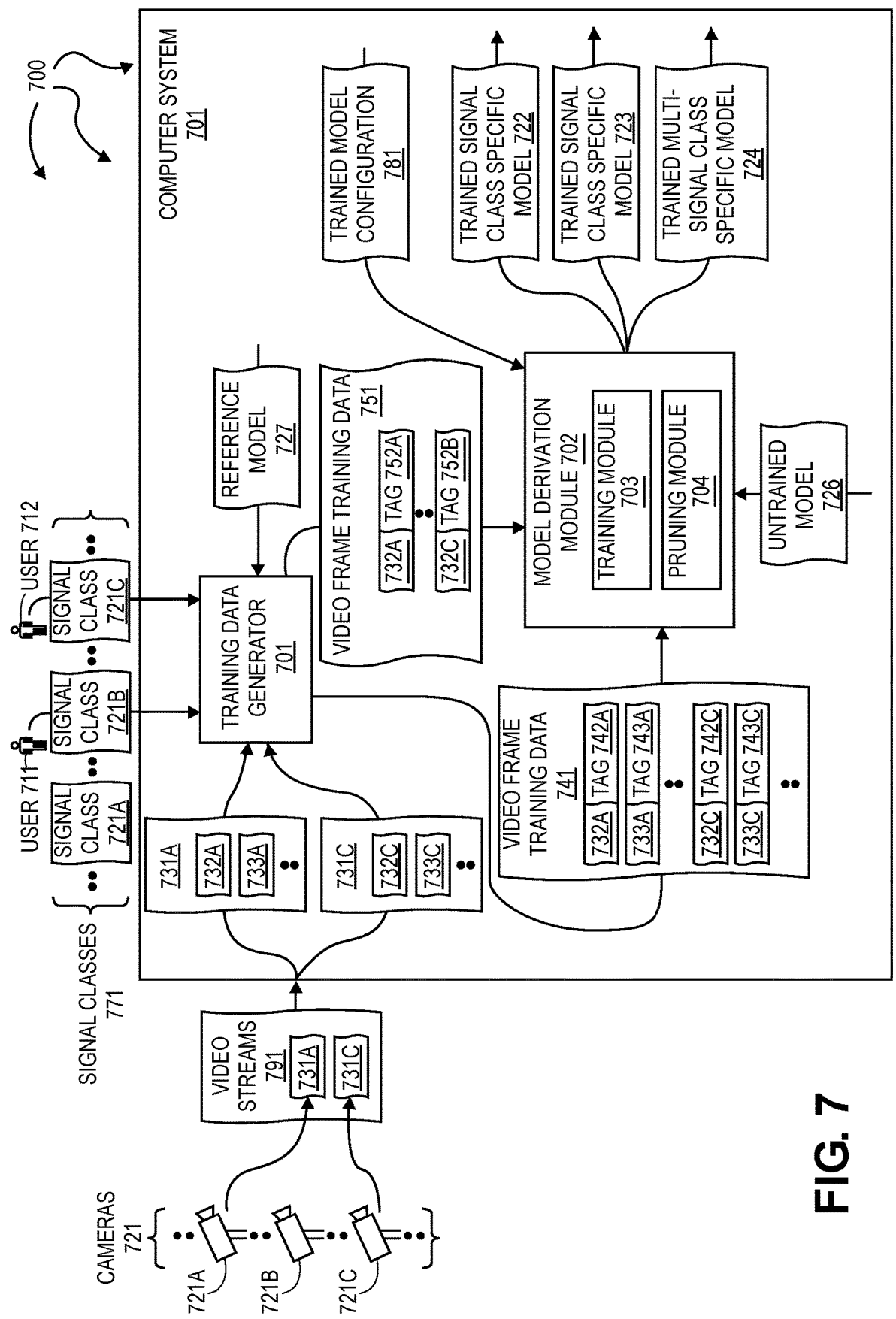
FIG. 7 illustrates a computer architecture that facilitates deriving a signal class specific model for video.

FIG. 7 depicts a computer architecture 700 that facilitates deriving a signal class specific model for video.

A specific class of signal can be an electronic video signal evidencing a class of event, such as, for example, a fire (structure, wild, forest, etc.), an accident, police presence, a shooting, environmental including weather (fog, snow, rain, reduced visibility conditions, etc.), natural disaster (hurricane, tornado, severe thunderstorms, mudslide, earthquake, etc.), medical emergency, issues with public utilities, etc. Some signals may evidence multiple classes of events. For example, a video including flames and smoke in a forested area may be classified as a fire event and as an environmental event causing reduced visibility.

As depicted, computer architecture 700 includes computer system 701, cameras 721, and users 711 and 712. Cameras 721 include cameras 721A, 721B, 721C, etc. In one aspect, cameras 721 each have a field of view. For each camera 721, the camera's field of view can have a requisite similarity to other cameras' fields of view. For example, each of cameras 721 can have a field of view towards the same geographic area, such as, mountain range, forest, government managed land, etc. or a portion thereof. Each of cameras 721 may be configured at different locations and/or at different angles but may be generally perceiving (e.g., pointed at) the same geographic area. Cameras 721 can include fixed mounted cameras and/or adjustable cameras.

Computer system 701 includes training data generator 701, model derivation module 701, and reference model 727. Signal classes 771 include signal classes 771A, 771B, 771C, etc. Each of signal classes 771 can correspond to a class of signal, for example, from among: a fire (structure, wild, brush, forest, etc.), an accident (without injury, with injury, fatality, etc.), police presence, a shooting, environmental including weather (fog, snow, rain, reduced visibility conditions, etc.), natural disaster (hurricane, tornado, severe thunderstorms, mudslide, landslide, earthquake, etc.), medical emergency, etc. or any other signal class described in this specification. For example, signal class 771A can correspond to forest fire, signal class 771B can correspond to a structure fire, signal class 717C can correspond to a mudslide, etc. Other combinations of signal classes are also possible.

Generally, training data generator 701 is configured to generate training data that can be used to train signal class specific models. A user can indicate a signal class to training data generator 701. In response, training data generator 701 can generate corresponding training data. Model derivation module 702 can use the training data to train a signal class specific model to detect signals of the indicated signal class. Generating training data can include accessing one or more video streams from cameras 721. Generating training data can also include accessing reference model 727. Reference model 727 can be previously configured (e.g., trained) to detect any of a plurality of signal classes, including but not limited to: a fire (structure, wild, brush forest, etc.), an accident (without injury, with injury, fatality, etc.), police presence, a shooting, environmental including weather (fog, snow, rain, reduced visibility conditions, etc.), natural disaster (hurricane, tornado, severe thunderstorms, mudslide, earthquake, etc.), medical emergency, issues with public utilities, etc.

Using reference model 727, training data generator 701 can check each frame in the one or more video streams for sufficient evidence of the indicated signal class. Training data generator 701 can tag each frame with a data tag that indicates (a) the frame does include sufficient evidence of the indicated signal class or (b) the frame does not include sufficient evidence of the indicated signal class. Training data generator 701 can output video frame training data including the tagged frames. In one aspect, sufficient evidence is a specified probability of a frame indicating the indicated signal class. If reference model 727 computes a probability exceeding the specified probability for a frame, training data generator 701 tags the frame as including sufficient evidence of the indicated signal class.

As depicted, model derivation module 702 includes training module 703 and pruning module 704. Model derivation module 702 can access video frame training data generated by training data generator 701. Training module 703 can use the video frame training data to derive a signal class specific model to detect signals of the indicated signal class (but not necessarily signals of any other signal classes). In one aspect, training module 703 uses video frame training data to train an untrained model to detect signals of the indicated signal class.

A signal class specific model can be smaller size relative to reference model 727. For example, a signal class specific model may be megabytes in size while reference model 727 is gigabytes in size. Accordingly, a signal class specific model can be more efficiently utilized in environments having reduced computing resources (e.g., one or more of processing, system memory, or storage resources), including mobile devices (e.g., smart phones).

Pruning module 704 is configured to prune (remove) components of an existing signal class specific model to derive another signal class specific model.

In one aspect, reference model 727 and any derived signal class specific models are neural networks, such as, for example, Convolutional Neural Networks (CNNs). Pruning module 704 can prune nodes and connections from an existing neural network to derive another neural network. Within a neural network, some nodes and connections may contribute more to output relative to other nodes and connections. Pruning module 704 can prune nodes and connections with less contribution to model output can be pruned. Generally, pruning reduces signal class specific model size.

Pruning of a signal class specific model can be tailored based on resources of computing device platform where the signal class specific model is to be used. For example, it may be that a signal class specific model is derived for a personal computer platform (e.g., laptop or desktop). Subsequently, it may be appropriate to run the signal class specific model on a mobile phone (or even on, for example, embedded within, a camera). Pruning module 704 can prune components (e.g., nodes and connections) of the signal class specific model to derive another signal class specific model configured to operate in the resource footprint of the mobile phone (or camera). Pruning model 704 can prune nodes and connections that contribute less to mathematical precision. As such, the resource requirements of the other signal class specific mode can be reduced in a manner that minimizes reduction in mathematical precision.

Reduction in mathematical precision can depend on the complexity of the signal class specific model under consideration to be pruned. If the signal class specific model is relatively simple, limited (or even no) pruning may be appropriate. On the other hand, if the signal class specific model is relatively complex, significant pruning may be appropriate. Based at least in part on signal class specific model complexity and resource footprint at a computing device platform where the signal class specific model is to be used, pruning can reduce mathematical precision in a range from 0% to around 60%.

As such, in one aspect model derivation model 702 derives a signal class specific model for one computing platform and then pruning module 704 prunes the signal class specific model for another computing platform. In another aspect, derivation module 702 derives a version of a signal class specific model for one computing platform and derives another version of the signal class specific model for another computing platform.

Trained model configuration 781 can store resource configurations for different computing platforms. Model derivation module 702 can refer to trained model configuration 781 when deriving, training, and pruning signal class specific models from video frame training data.

Figure 8:
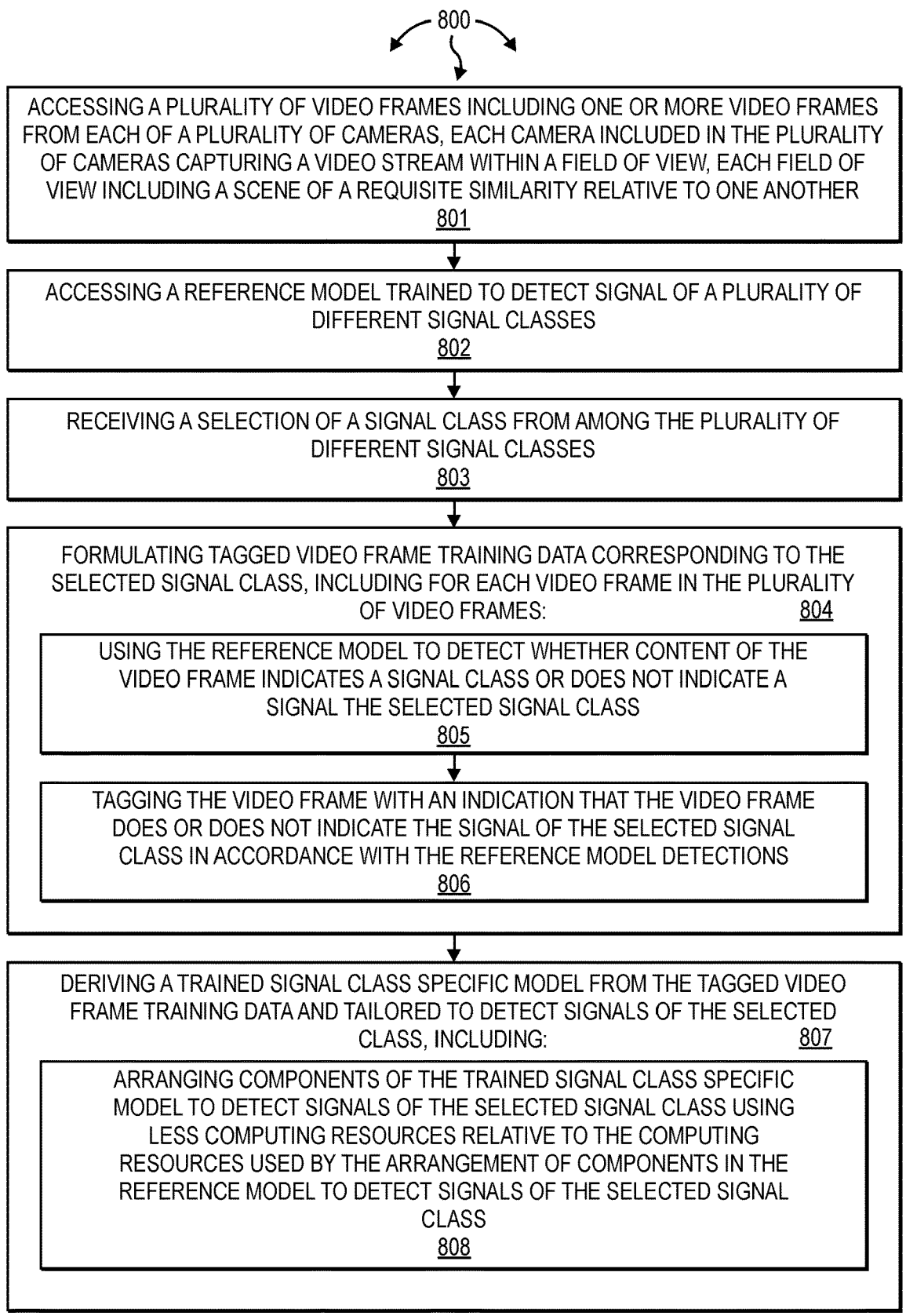
FIG. 8 illustrates a flow chart of an example method for deriving a signal class specific model for video.

FIG. 8 illustrates a flow chart of an example method 800 for deriving a signal class specific model from video. Method 800 will be described with respect to the components and data in computer architecture 700.

Method 800 includes accessing a plurality of video frames including one or more video frames from each of a plurality of cameras, each camera included in the plurality of cameras capturing a video stream within a field of view, each field of view including a scene of a requisite similarity relative to one another (801). For example, computer system 701 can access video streams 791. Video streams 791 includes video streams 731A and 731C from cameras 721A and 721B respectively. As depicted, video stream 731A includes frames 732A, 733A, etc. and video stream 731C includes frames 732C, 733C, etc. Training data generator 701 can access video streams 731A and 731C.

Method 800 includes accessing a reference model trained to detect signals of a plurality of different signal classes (802). For example, training data generator 701 can access reference model 727. As described, reference model 727 can be configured to detect any of signal classes 771.

Method 800 includes receiving a selection of a signal class from among the plurality of different signal classes (803). For example, training data generator 701 can receive a selection of signal class 771B from user 711.

Method 800 includes formulating tagged video frame training data corresponding to the selected signal class (804). For example, training data generator 701 can formulate video frame training data 741.

Formulating tagged video frame training data (804) includes for each video frame in the plurality of video frames, using the reference model to detect whether content of the video frame indicates a signal of the selected signal class or does not indicate a signal the selected signal class (805). For example, training data generator 701 can use reference model 727 to detect if content of frames 732A, 733A, 732C, 733C, etc. do indicate a signal of signal class 771B or do not indicate a signal of signal class 771B.

Formulating tagged video frame training data (804) includes for each video frame in the plurality of video frames, tagging the video frame with an indication that the video frame does or does not indicate the signal of the selected signal class in accordance with the reference model detections (806). For example, training data generator 701 can tag frame 732A with tag 742A. Tag 742A indicates whether frame 732A does or does not indicate a signal of signal class 771B. Training data generator 701 can tag frame 733A with tag 743A. Tag 743A indicates whether frame 733A does or does not indicate a signal of signal class 771B. Training data generator 701 can tag frame 732C with tag 742C. Tag 742C indicates whether frame 732C does or does not indicate a signal of signal class 771B. Training data generator 701 can tag frame 733C with tag 743C. Tag 743C indicates whether frame 733C does or does not indicate a signal of signal class 771B.

Method 800 includes deriving a trained signal class specific model from the tagged video frame training data and tailored to detect signals of the selected signal class (807). For example, model derivation module 702 can derive trained signal class specific model 722 from video frame training data 741. Trained signal class specific model 722 can be tailored to detect signals of signal class 771B. In one aspect, training module 703 trains untrained model 726 using video frame training data 741. Trained signal class specific model 722 can be significantly smaller in size than reference module 727 (e.g., Megabytes vs. Gigabytes).

Deriving a trained signal class specific model (807) includes arranging components of the trained signal class specific model to detect signals of the selected signal class using less computing resources relative to the computing resources used by the arrangement of components in the reference model to detect signals of the selected signal class (808). For example, model derivation module 702 can arrange components of trained signal class specific model 722 to detect signals of signal class 771B using less computing resources than components of reference model 727. Trained signal class specific model 722 is essentially a specialized model to detect signal class 771B. On the other hand, reference model 727 is a general model to detect any of signal classes 771.

Either of reference model 727 or trained class specific model 722 can be a neural network, such as, a CNN. As such, derivation module 702 can arrange nodes and connections of trained signal class specific model 722 to detect signals of signal class 771B using less computing resources than nodes and connections of reference model 727.

In one aspect, model derivation module 702 also accesses trained model configuration 781. Model derivation module 702 considers trained model configuration 781 when arranging components (e.g., nodes and connections) of trained signal class specific model 722. For example, model derivation module 702 can use contents of trained model configuration 781 to arrange components of trained signal class specific model 722 for a specific computing platform (e.g., a mobile phone or camera). Mathematical precision can be maximized while maintaining resource consumption appropriate for the specific computing platform.

Training data generator 701 may also receive a selection of signal class 771C from user 712. Training data generator 701 can formulate video frame training data 751.

Training data generator 701 can tag frame 732A with tag 752A. Tag 752A indicates whether frame 732A does or does not indicate a signal of signal class 771C. Training data generator 701 can tag frame 732C with tag 752C. Tag 752C indicates whether frame 732C does or does not indicate a signal of signal class 771C.

Model derivation module 702 can derive trained signal class specific model 723 from video frame training data 751. Trained signal class specific model 722 can be tailored to detect signals of signal class 771C. In one aspect, training module 703 trains untrained model 726 using video frame training data 751. Trained signal class specific model 723 can be significantly smaller in size than reference module 727 (e.g., Megabytes vs. Gigabytes).

Model derivation module 702 can arrange components of trained signal class specific model 723 to detect signals of signal class 771C using less computing resources than components of reference model 727. Trained signal class specific model 723 is essentially a specialized model to detect signal class 771C. On the other hand, reference model 727 is a general model to detect any of signal classes 771.

Trained class specific model 723 can be a neural network, such as, a CNN. As such, derivation module 702 can arrange nodes and connections of trained signal class specific model 723 to detect signals of signal class 771C using less computing resources than nodes and connections of reference model 727.

In one aspect, model derivation module 702 also accesses trained model configuration 781. Model derivation module 702 considers trained model configuration 781 when arranging components (e.g., nodes and connections) of trained signal class specific model 723. For example, model derivation module 702 can use contents of trained model configuration 781 to arrange components of trained signal class specific model 723 for a specific computing platform (e.g., a mobile phone or camera). Mathematical precision can be maximized while maintaining resource consumption appropriate for the specific computing platform.

In a further aspect, model derivation module 702 derives trained multi-signal class specific model 724 from both video frame training data 741 and video frame training data 751. Trained multi-signal class specific model 724 is essentially a specialized model to detect signal classes 771B and 771C. On the other hand, reference model 727 is a general model to detect any of signal classes 771. Trained multi-signal class specific model 724 can be significantly smaller in size than reference module 727 (e.g., Megabytes vs. Gigabytes).

Trained multi-class specific model 724 can be a neural network, such as, a CNN. As such, derivation module 702 can arrange nodes and connections of trained multi-signal class specific model 724 to detect signals of signal class 771C using less computing resources than nodes and connections of reference model 727.

In an additional aspect, pruning module 704 can prune any of trained signal class specific model 722, trained signal class specific model 723, trained multi-signal class specific model 724 to reduce resource footprint while minimizing reduction in mathematical precision.

Computer system 701 may deploy (possibly appropriately pruned) versions of any of trained signal class specific model 722, trained signal class specific model 723, or trained multi-signal class specific model 724 to event infrastructure 103, to a mobile device (e.g., a phone), to a camera, to another device, etc. Deployed models can be subsequently be used to facilitate event detection.

Video Classification

Figure 9:
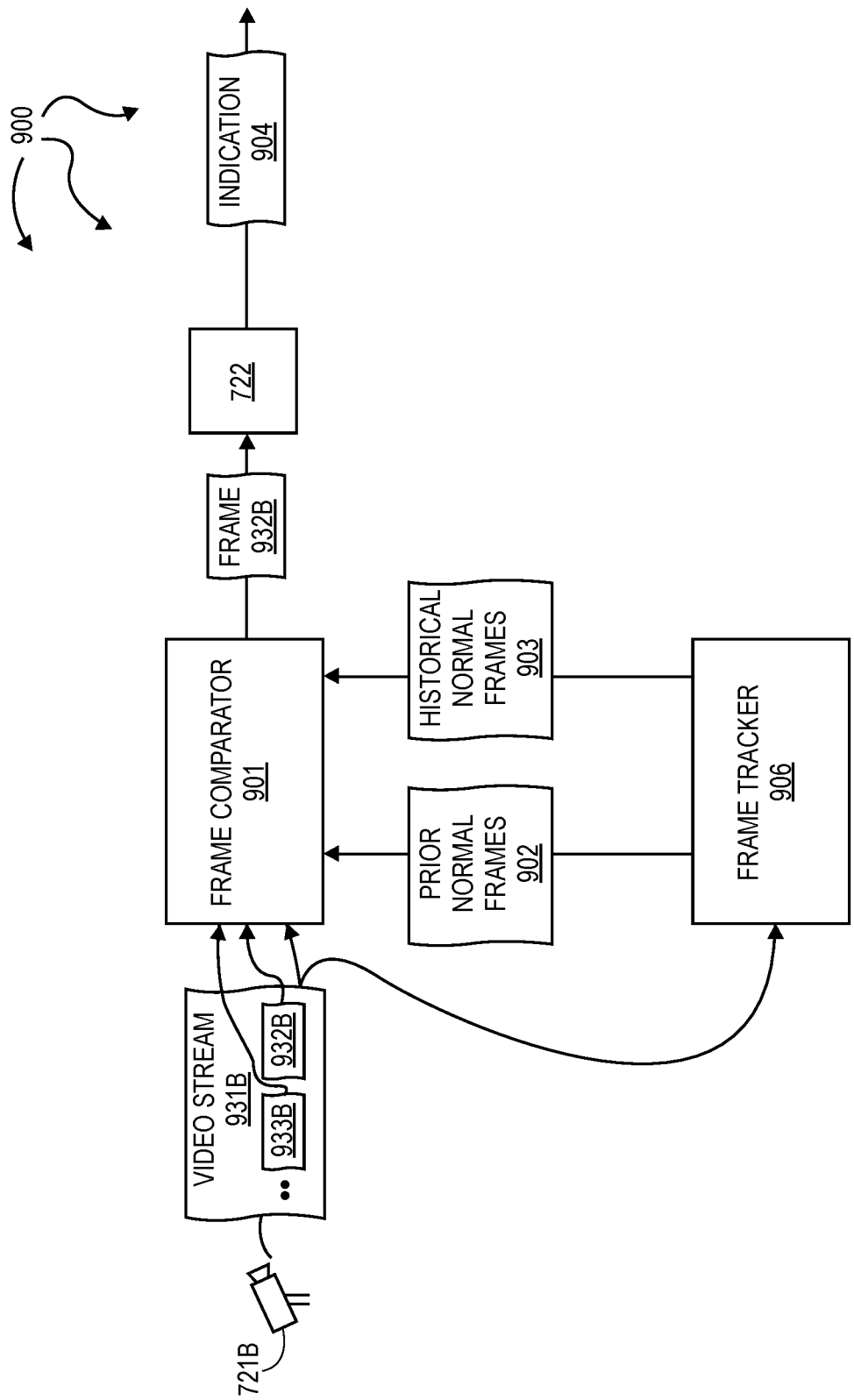
FIG. 9 illustrates a computer architecture that facilitates detecting a signal of a specific class from video.

FIG. 9 depicts a computer architecture 900 that facilitates detecting a signal of a specific class from video. Within computer architecture 900, model 722 is deployed to attempt to detect signals of signal class 771B. Computer architecture 900 also includes frame comparator 901 and frame tracker 906.

Frame tracker 906 is configured to maintain (e.g., track) one or more (e.g., different) groupings of previously received frames from camera 721B. Each of the one of more groups can be associated with a different prior time period. In one aspect, frame tracker maintains a group of prior normal frames (e.g., frames received 1-5 minutes prior) and a group of historical normal frames (e.g., an average of frames over the last 1-2 hours prior) associated with camera 721B. However, additional frame groupings associated with other prior time periods (e.g., frames within the last minutes, average of frames over the last 3, 6, 12, or 24 hours, average of frames over the last week, etc.) are also possible.

In a more specific example, frame tracker 906 is configured to track frames of video stream 931B over time. Frame tracker 906 can maintain a buffer storing prior normal frames 902. The buffer can be sized to store frames of video stream 931B received within a first specified time period, such as, for example, within the last 1-5 minutes. As the specified amount of time expires for each frame, the frame is removed from the buffer. As new frames are received, the new frames are stored in the buffer. Thus, prior normal frames 202 can represent frames captured by camera 921B within the specified time period.

Frame tracker 906 can also maintain a buffer for historical normal frames 903. On an ongoing basis, frame tracker 906 can calculate (and continually re-calculate) a moving average of frames received within a second specified time period, for example, within the last 1-3 hours or longer. Frame tracker 906 can represent the moving average in historical normal frames 903. As new frames are received, the moving average is re-calculated. Thus, historical normal frames 903 can represent an average of frames captured by camera 721B within the second specified time period.

In response and subsequent to frame comparator 901 receiving a new frame from camera 721B, frame tracker 906 can send a subset of frames (e.g., at least one frame) associated with each of one or more frame groupings to frame comparator 901. Frame comparator 901 can receive the frame subset associated with each of the one or more frame groupings from frame tracker 906. Frame comparator 901 can compare the newly received frame to the frame subset associated each of the one or more frame groupings. Frame comparator 901 can send a newly received frame that differs from frames contained in at least one frame subset to model 722.

It may be frame tracker 906 sends one frame subset associated with a frame group to frame comparator 901. If a newly received frame from differs from the frame subset, frame comparator 901 sends the newly received frame to model 722. Alternatively, it may be that frame tracker 906 sends a plurality of frame subsets associated with a corresponding plurality of frame groups to frame comparator 901. In one aspect, if a newly received frame differs from some, but not all, (e.g., at least one) of the plurality of frame subsets, frame comparator 901 sends the newly received frame to model 722. In another aspect, if a newly received frame differs from each (e.g., all) of the plurality of frame subsets, frame comparator 901 sends the newly received frame to model 722.

In a more specific example, frame tracker 906 can send at least one prior normal frame (and possibly a plurality of prior normal frames) and at least one historical frame (and possibly a plurality of historical normal frames) to frame comparator 901. Frame comparator 901 can compare a new received frame to the one or more prior normal frames and/or to the one or more historical frames. If the newly received frame differs from both the at least one prior normal frame and the at least one historical frame, frame comparator 901 sends the newly received frame to model 722.

Thus, frame comparator 901 can compare a frame from video stream 931B to prior normal frames 902 and can compare the frame to historical normal frames 903. If frame comparator 901 detects a relevant difference between the frame and prior normal frames 902 and also detects a relevant difference between the frame and historical normal frames 903, frame comparator 901 can send the frame to model 722. On the other hand, if frame comparator 901 does not detect a relevant difference between the frame and normal frames 902 and/or does not detect a relevant difference between the frame and historical normal frames 903, frame comparator 901 does not send the frame to model 722.

In one aspect, frame comparator 901 detects a relevant difference between a frame and prior normal frames 902 when at least a specified percentage of content in the frame differs from content in prior normal frames 902. Similarly, frame comparator 901 can detect a relevant difference between a frame and historical normal frames 903 when at least a specified percentage of content in the frame differs from content in prior normal frames 902.

When a relevant difference is not detected for a frame, there is a reduced likelihood of the frame containing a signal of interest (e.g., a signal indicative of an event in any of signal classes 771). That is, more recent camera observations contain essentially the same content as earlier camera observations within the first specified time period and/or (e.g., the average of) earlier cameras observations within the second specified time period. As such, running the frame through model 722 is less likely to yield a signal of class 771B (or any other signal class).

On the other hand, when relevant differences are detected, there is increased likelihood of the of the frame containing a signal of interest. That is, more recent camera observations may contain content differing from earlier camera observations within the first specified time period and (e.g., the average of) earlier cameras observations within the second specified time period. As such, running the frame through model 722 is more likely to yield a signal of class 771B.

Thus, frames with increased likelihood of indicating a signal of interest can be sent to model 722 while other frames are essentially filtered out. Accordingly, resources used to execute model 722 are conserved and allocated for frames more likely to contain signals of interest.

In one aspect, frame comparator 901, frame tracker 906, and model 722 are internal to camera 721B.

In another aspect, frame comparator 901, frame tracker 906, and model 722 are external to camera 721B. For example, frame comparator 901, frame tracker 906, and model 722 can be included in event detection infrastructure 103. A raw video stream corresponding to video stream 931B can be ingested by signal ingestion modules 101. The raw streaming signal may be any of a social signal 171, a web signal 172, or a streaming signal 173. Ingestion modules 101 can normalize the raw video stream into video stream 931B (i.e., a normalized video stream). Ingestion modules 101 can send video stream 931B to event detection infrastructure 103. Frame comparator 901, frame tracker 906, and model 722 can interoperate to process frames of video stream 931B within event detection infrastructure 103.

Figure 10:
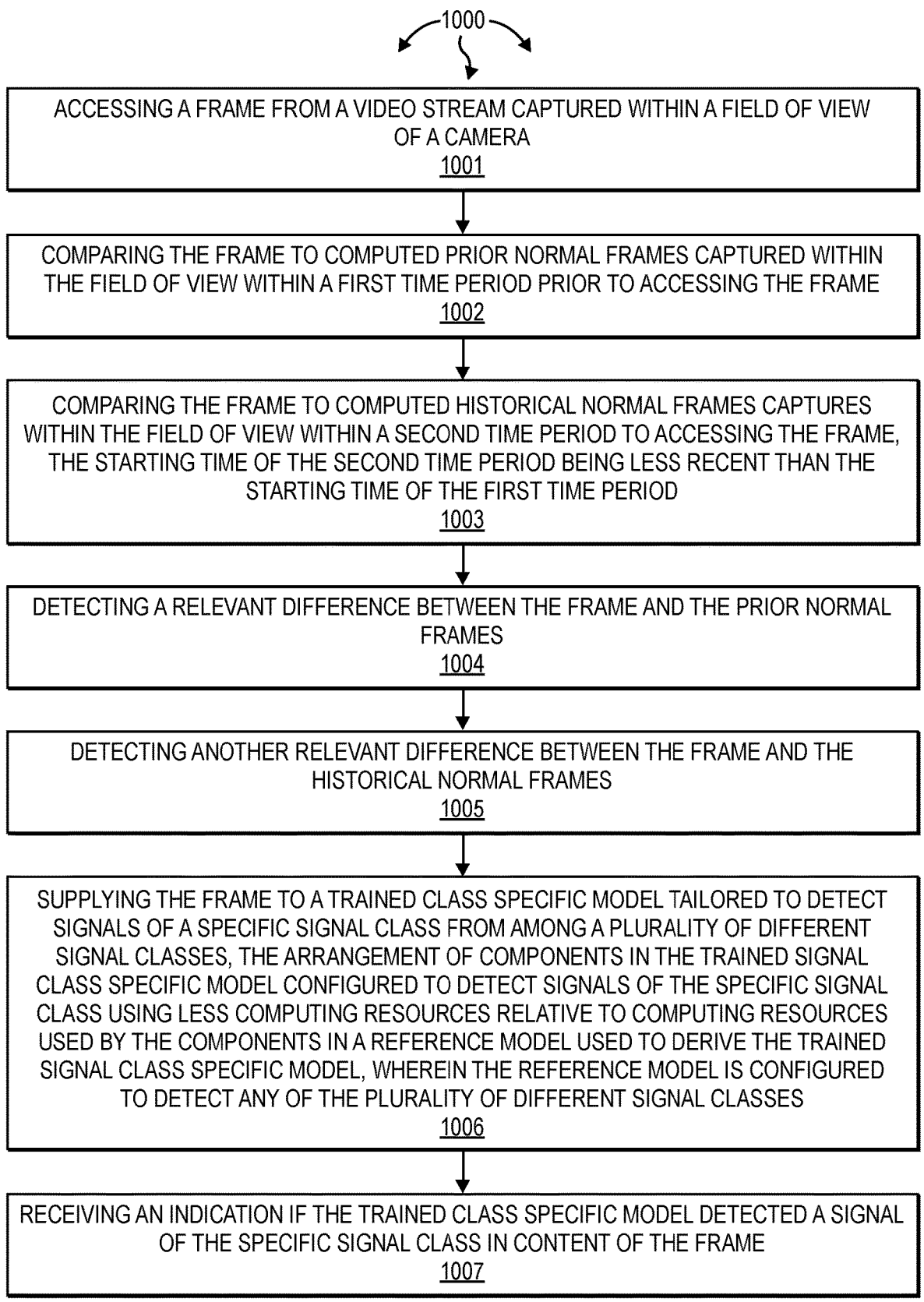
FIG. 10 illustrates a flow chart of an example method for detecting a signal of a specific class from video.

FIG. 10 illustrates a flow chart of an example method 1000 for detecting a signal of a specific class from video. Method 1000 will be described with respect to the components and data in computer architecture 900.

Method 1000 includes accessing a frame from a video stream captured within a field of view of a camera (1001). For example, frame comparator 901 can receive frame 932B from video stream 931B. Method 1000 includes comparing the frame to computed prior normal frames captured within the field of view within a first time period prior to accessing the frame (1002). For example, frame comparator 901 can compare frame 932B to prior normal frames 902.

Method 1000 includes comparing the frame to computed historical normal frames captured within the field of view within a second time period prior to accessing the frame, the starting time of the second time period being less recent than the starting time of the first time period (1003). For example, frame comparator 901 can compare frame 932B to historical normal frames 903.

Method 1000 includes detecting a relevant difference between the frame and the prior normal frames (1004). For example, frame comparator 901 can detect a relevant difference between frame 932B and prior normal frames 902. In one aspect, frame comparator 901 detects that content in frame 932B differs from content in prior normal frames 902 by at least a first specified percentage.

Method 1000 includes detecting a relevant difference between the frame and the historical normal frames (1005). For example, frame comparator 901 can detect a relevant difference between frame 932B and historical normal frames 903. In one aspect, frame comparator 901 detects that content in frame 932B differs from content in historical normal frames 903 by a second specified percentage. The second percentage may be the same as or differ from the first specified percentage.

Method 1000 includes supplying the frame to a trained class specific model tailored to detect signals of a specific signal class from among a plurality of different signal classes, the arrangement of components in the trained signal class specific model configured to detect signals of the specific signal class using less computing resources relative to computing resources used by the components in a reference model used to derive the trained signal class specific model, wherein the reference model is configured to detect any of the plurality of different signal classes (1006). For example, frame comparator 901 can send frame 932B to model 122.

Method 1000 includes receiving an indication if the trained class specific model detected a signal of the specific signal class in content of the frame (1007). For example, model 722 can determine if content of frame 932B contains a signal of class 771B. Model 722 can formulate indication 904 indicating whether or not a signal of signal class 771B was detected in frame 932B. Model 722 can send the indication, for example, to user 711 or user 712, to event notification 116, to other components in an event detection pipeline, to another computer system, etc.

Frame 932B can also be sent to frame tracker 906. Frame tracker 906 can use frame 932B in subsequent calculations for prior normal frames 902 and historical normal frames 903.

Frame comparator 901 can also receive frame 933B from video stream 931B. Frame comparator 901 can compare frame 933B to prior normal frames 902. Frame comparator 901 can also compare frame 933B to historical normal frames 903. Frame comparator 901 can detect lack of a relevant difference between at least one of: (1) frame 933B and prior normal frames 902 and (2) frame 933B and historical normal frames 903. In response, frame comparator 901 can filter out frame 933B preventing frame 933B from being supplied to model 722.

In one aspect, relevant differences between a frame and prior normal frames are detected in accordance with a first sensitivity threshold. The first sensitivity threshold can define how different a frame as to be from prior normal frames for a difference to be relevant.

Similarly, relevant differences between a frame and historical normal frames can be detected in accordance with a second sensitivity threshold. The second sensitivity threshold can define how different a frame as to be from historical normal frames for a difference to be relevant.

The first and second sensitivity thresholds may be the same or can differ.

The components in computer architectures 700 and 900 can be connected to (or be part of) a network, such as, for example, a system bus, a Local Area Network ("LAN"), a Wide Area Network ("WAN"), and even the Internet, along with components of computer architecture 100. Accordingly, the components as well as any other connected computer systems and their components can create and exchange data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network. As such, components in computer architectures 700 and 900 can interoperate with components in computer architecture 100 to implement aspects of the invention.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A method comprising:
   accessing a plurality of video frames including one or more video frames from each of a plurality of cameras, each camera included in the plurality of cameras capturing a video stream within a field of view, each field of view including a scene of a requisite similarity relative to one another;
   accessing a reference model trained to detect signals of a plurality of different signal classes;
   receiving a selection of a signal class from among the plurality of different signal classes;
   formulating tagged video frame training data corresponding to the selected signal class, including for each video frame in the plurality of video frames:
   using the reference model to detect whether content of the video frame indicates a signal of the selected signal class or does not indicate a signal the selected signal class; and
   tagging the video frame with an indication that the video frame does or does not indicate the signal of the selected signal class in accordance with the reference model detections;
   determining available resources at a computing device that is to implement a trained signal class specific model;
   deriving a model size constraint based on the available resources; and
   deriving the trained signal class specific model from the tagged video frame training data, satisfying the model size constraint, and tailored to detect signals of the selected signal class, including:
   arranging components of the trained signal class specific model to detect signals of the selected signal class using less computing resources relative to the computing resources used by the arrangement of components in the reference model to detect signals of the selected signal class.

2. The method of claim 1, wherein deriving a trained signal class specific model comprises training the trained signal class specific mode using the tagged video frame training data.

3. The method of claim 1, further comprising deriving a second trained signal class specific model from the tagged video frame training data and tailored to detect signals of the selected signal class, including:
   arranging components of the second trained signal class specific model to detect signals of the selected signal class using less computing resources relative to the computing resources used by the arrangement of components in the reference model to detect signals of the selected signal class.

4. The method of claim 3, wherein deriving a second trained signal class specific model comprises training the second trained signal class specific model using the tagged video frame training data.

5. The method of claim 3, wherein deriving a second trained signal class specific model comprises tailoring components of the second trained signal class specific model to run on the resources of a mobile device.

6. The method of claim 3, wherein deriving a second trained signal class specific model comprises reducing the precision of mathematical calculations in the second trained signal class specific model relative to the precision of mathematical calculations in the trained signal class specific model.

7. The method of claim 3, wherein deriving a second trained signal class specific model comprises reducing the size of the second trained signal class specific model relative to the size of the trained signal class specific model.

8. The method of claim 7, wherein reducing the size of the second trained signal class specific model relative to the size of the trained signal class specific module comprises deriving the second signal class specific module to have a size of less than one gigabyte.

9. The method of claim 3, wherein deriving a second trained signal class specific model comprises:
   identifying one or more lower value components in the trained signal class specific model in view of the available resources at the computing device that is to implement the trained signal class specific model; and
   pruning the one or more lower value components from the trained signal class specific model satisfying the model size constraint.

10. The method of claim 9, wherein deriving a trained signal class specific model comprises deriving a trained signal class specific model neural network;

wherein identifying one or more lower value components in the trained signal class specific model comprises identifying at least one of: a node in the trained signal class specific model neural network or a connection in the trained signal class specific model neural network; and wherein pruning the one or more lower value components from the trained signal class specific model comprises pruning the at least one of: the node of the connection from the trained signal class specific model neural network.

11. The method of claim 1, wherein accessing a plurality of video frames comprises accessing a plurality of video frames captured at a camera;

wherein determining available resources at a computing device that is to implement a trained signal class specific model comprises determining available resources at the camera; and wherein arranging components of the trained class specific model comprises tailoring the components of the trained class specific model to run on the camera.

12. The method of claim 11, wherein deriving a trained signal class specific model comprises deriving a trained signal class specific neural network model; and wherein tailoring the components of the trained class specific model comprises tailoring the number and arrangement of nodes and connections in the trained signal class specific neural network model.

13. The method of claim 1, further comprising:
receiving a selection of another signal class from among the plurality of different signal classes; and
formulating other tagged video frame training data corresponding to the selected other signal class, including for each video frame in the plurality of video frames:
using the reference model to detect whether content of the video frame indicates a signal of the selected other signal class or does not indicate a signal the selected other signal class; and
tagging the video frame with an indication that the video frame does or does not indicate the signal of the selected other signal class in accordance with the reference model detections; and
wherein deriving a trained signal class specific model comprises deriving a trained multi-signal class specific model from the tagged video frame training data and the other tagged video frame training data and configured to detect: signals of the selected signal class and detect signals of the selected other signal class, including:
arranging components in the trained multi-signal class specific model to detect signals of the other selected signal class using less computing resources relative to the computing resources used by the components in the reference model to detect signals of the selected other signal class.

14. The method of claim 13, wherein deriving a trained multi-signal class specific model comprises deriving a trained multi-signal class specific neural network model; and
wherein arranging components in the trained multi-signal class specific model comprises arranging nodes and connections in the trained multi-signal class specific neural network model.

15. A method comprising:
accessing a plurality of video frames including one or more video frames from each of a plurality of cameras, each camera included in the plurality of cameras capturing a video stream within a field of view, each field of view including a scene of a requisite similarity relative to one another;
accessing a reference neural network model previously trained to detect signals of a plurality of different signal classes;
receiving a selection of a signal class from among the plurality of different signal classes;
formulating tagged video frame training data corresponding to the selected signal class, including for each video frame in the plurality of video frames:
using the reference neural network model to detect whether content of the video frame indicates a signal of the selected signal class or does not indicate a signal the selected signal class; and
tagging the video frame with an indication that the video frame does or does not indicate the signal of the selected signal class in accordance with the reference neural network model detections;
accessing an untrained neural network model;
determining available resources at a computing device that is to implement a trained signal class specific neural network model;
deriving a model size constraint based on the available resources; and
training the untrained neural network model deriving the trained signal class specific neural network model from the tagged video frame training data, satisfying the model size constraint, and tailored to detect signals of the selected signal class, including:
arranging nodes and connections in the trained class specific neural network model to detect signals of the selected signal class using less computing resources relative to the computing resources used by the arrangement of nodes and connections in the reference neural network model to detect signals of the selected signal class.

16. The method of claim 15, wherein the reference neural network model comprises a reference Convolutional Neural Network (CNN); and
wherein the trained signal class specific model comprises a trained signal class specific Convolutional Neural Network (CNN).

17. The method of claim 15, further comprising
deriving a second trained signal class specific neural network model from the tagged video frame training data and tailored to detect signals of the selected signal class, including:
arranging nodes and connections of the second trained signal class specific neural network model to detect signals of the selected signal class using less computing resources relative to the computing resources used by the arrangement of nodes and connections in the reference neural network model to detect signals of the selected signal class.

18. The method of claim 17, wherein deriving a second trained signal class specific neural network model comprises:
identifying one or more lower value components in the trained signal class specific neural network model in view of the available resources at the computing device that is to implement the trained signal class specific model; and
pruning the one or more lower value components from the trained signal class specific neural network model satisfying the model size constraint.

19. The method of claim 15, further comprising
deriving a second trained signal class specific neural network model from the tagged video frame training data and tailored to detect signals of the selected signal class, including:
arranging nodes and connections of the second trained signal class specific neural network model to detect signals of the selected signal class using less computing resources relative to the computing resources used by the arrangement of nodes and connections in the a trained signal class specific neural network model to detect signals of the selected signal class.

20. The method of claim 15, wherein accessing a plurality of video frames comprises accessing a plurality of video frames captured at a camera;
wherein determining available resources at a computing device that is to implement a trained signal class specific neural network model comprises determining available resources at the camera; and
wherein arranging components of the trained class specific neural network model comprises tailoring the components of the trained class specific neural network model to run on the camera.

21. A method comprising:
accessing a plurality of video frames including one or more video frames from each of a plurality of cameras, each camera included in the plurality of cameras capturing a video stream within a field of view, each field of view including a scene of a requisite similarity relative to one another;
accessing a reference model trained to detect signals of a plurality of different signal classes;
receiving a selection of a signal class from among the plurality of different signal classes;
formulating tagged video frame training data corresponding to the selected signal class, including for each video frame in the plurality of video frames:
using the reference model to detect whether content of the video frame indicates a signal of the selected signal class or does not indicate a signal the selected signal class; and
tagging the video frame with an indication that the video frame does or does not indicate the signal of the selected signal class in accordance with the reference model detections; and
deriving a trained signal class specific model from the tagged video frame training data and tailored to detect signals of the selected signal class, including:
arranging components of the trained signal class specific model to detect signals of the selected signal class using less computing resources relative to the computing resources used by the arrangement of components in the reference model to detect signals of the selected signal class;
deriving a second trained signal class specific model from the tagged video frame training data and tailored to detect signals of the selected signal class, including:
arranging components of the second trained signal class specific model to detect signals of the selected signal class using less computing resources relative to the computing resources used by the arrangement of components in the trained signal class specific model to detect signals of the selected signal class.

22. The method of claim 21, wherein reducing the size of the second trained signal class specific model relative to the size of the trained signal class specific module comprises deriving the second signal class specific module to have a size of less than one gigabyte.

23. The method of claim 21, wherein reducing the size of the second trained signal class specific model relative to the size of the trained signal class specific module comprises deriving the second signal class specific module to run on a camera.

24. The method of claim 21, wherein deriving a second trained signal class specific model comprises reducing the precision of mathematical calculations in the second trained signal class specific model relative to the precision of mathematical calculations in the trained signal class specific model.

* * * * *